United States Patent [19]

van den Bergh et al.

[11] Patent Number: 5,253,745
[45] Date of Patent: Oct. 19, 1993

[54] CONVEYING AND STORAGE SYSTEMS

[75] Inventors: Hugo van den Bergh, Enniskerry; John Hayes, Clane, both of Ireland

[73] Assignee: Oseney Limited, Dublin, Ireland

[21] Appl. No.: 756,050

[22] Filed: Sep. 6, 1991

[30] Foreign Application Priority Data

Sep. 7, 1990 [IE] Ireland ................................ 3258/90
Mar. 26, 1991 [IE] Ireland ................................ 998/91

[51] Int. Cl.⁵ ............................................. B65G 29/00
[52] U.S. Cl. ................................. 198/465.1; 198/795; 198/803.01
[58] Field of Search ................... 198/465.1–465.3, 198/803.01, 803.2, 795, 853, 841

[56] References Cited

U.S. PATENT DOCUMENTS

| 2,999,579 | 9/1961 | Kostrzewa . | |
|---|---|---|---|
| 3,418,084 | 12/1968 | Allington | 198/465.2 |
| 3,451,526 | 6/1969 | Fernandez | 198/853 |
| 3,622,043 | 11/1971 | Chotard | 198/465.1 |
| 3,703,870 | 11/1972 | Walton . | |
| 3,788,458 | 1/1974 | Braun . | |
| 4,029,961 | 6/1977 | Lohr et al. | 198/465.2 |
| 4,144,818 | 3/1979 | Fletcher | 198/465.1 |
| 4,147,250 | 4/1979 | Schulz | 198/465.2 |
| 4,185,812 | 1/1980 | Hall | 198/803.01 |
| 4,284,188 | 8/1981 | Gram | 198/795 |
| 4,378,741 | 4/1983 | Nagahori | 198/465.1 |
| 4,475,642 | 10/1984 | Fritz . | |
| 4,524,863 | 6/1985 | Moge . | |
| 4,640,410 | 2/1987 | Palmaer et al. | 198/841 |
| 4,742,907 | 5/1988 | Palmaer | 198/841 |
| 5,012,917 | 5/1991 | Gilbert et al. . | |
| 5,090,555 | 2/1992 | Kura | 198/465.2 |

FOREIGN PATENT DOCUMENTS

| 210826 | 8/1960 | Austria | 198/465.1 |
|---|---|---|---|
| 0163617 | 12/1985 | European Pat. Off. . | |
| 0366067 | 5/1990 | European Pat. Off. . | |
| 2586010 | 2/1987 | France . | |
| 1414643 | 11/1975 | United Kingdom . | |
| 1512646 | 6/1978 | United Kingdom . | |
| 2176454 | 12/1986 | United Kingdom . | |
| 2227986 | 8/1990 | United Kingdom . | |

Primary Examiner—Joseph E. Valenza
Attorney, Agent, or Firm—Young & Thompson

[57] ABSTRACT

A product-carrying tray 1 has longitudinally slotted end members 3 for sliding engagement on guide rails in a conveyor installation or storage unit. Transverse edges 2 of the tray are provided with coupling members 5 for interengagement with other like units also accommodated on the guide rails. In the illustrated embodiment, the coupling members 5 are defined by interengaging hook structures consisting of projecting portions 7 and laterally extending end portions 6. The tray of the invention is especially suited to accommodating food products within a storage or treatment chamber. The tray may however also serve as a product-carrying element in a conveyor installation. Apart from the hook-type interconnection illustrated, a multiplicity of other interconnecting arrangements may be provided, including, inter alia, alternative mechanical structures and magnetic coupling.

9 Claims, 16 Drawing Sheets

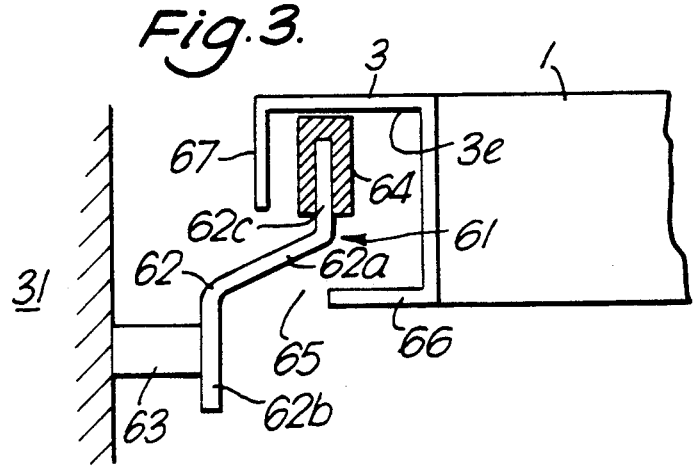
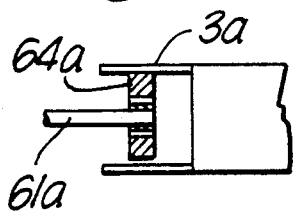 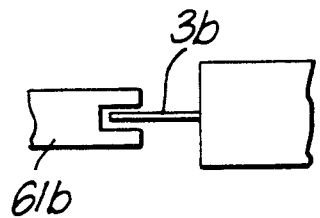
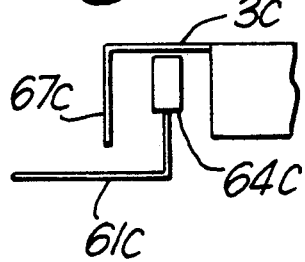 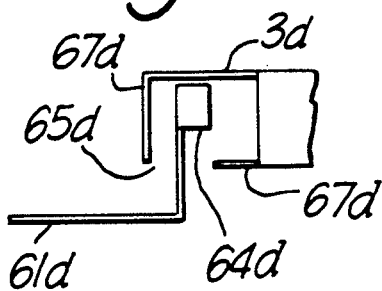

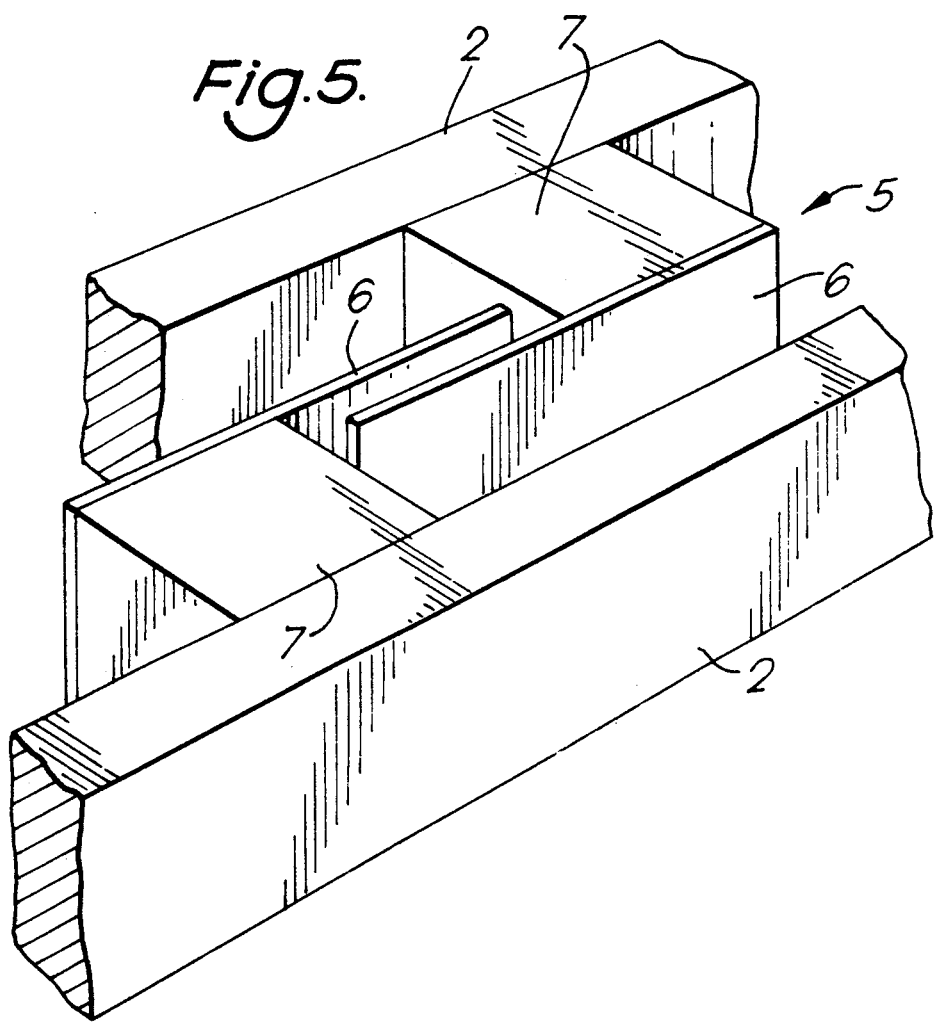

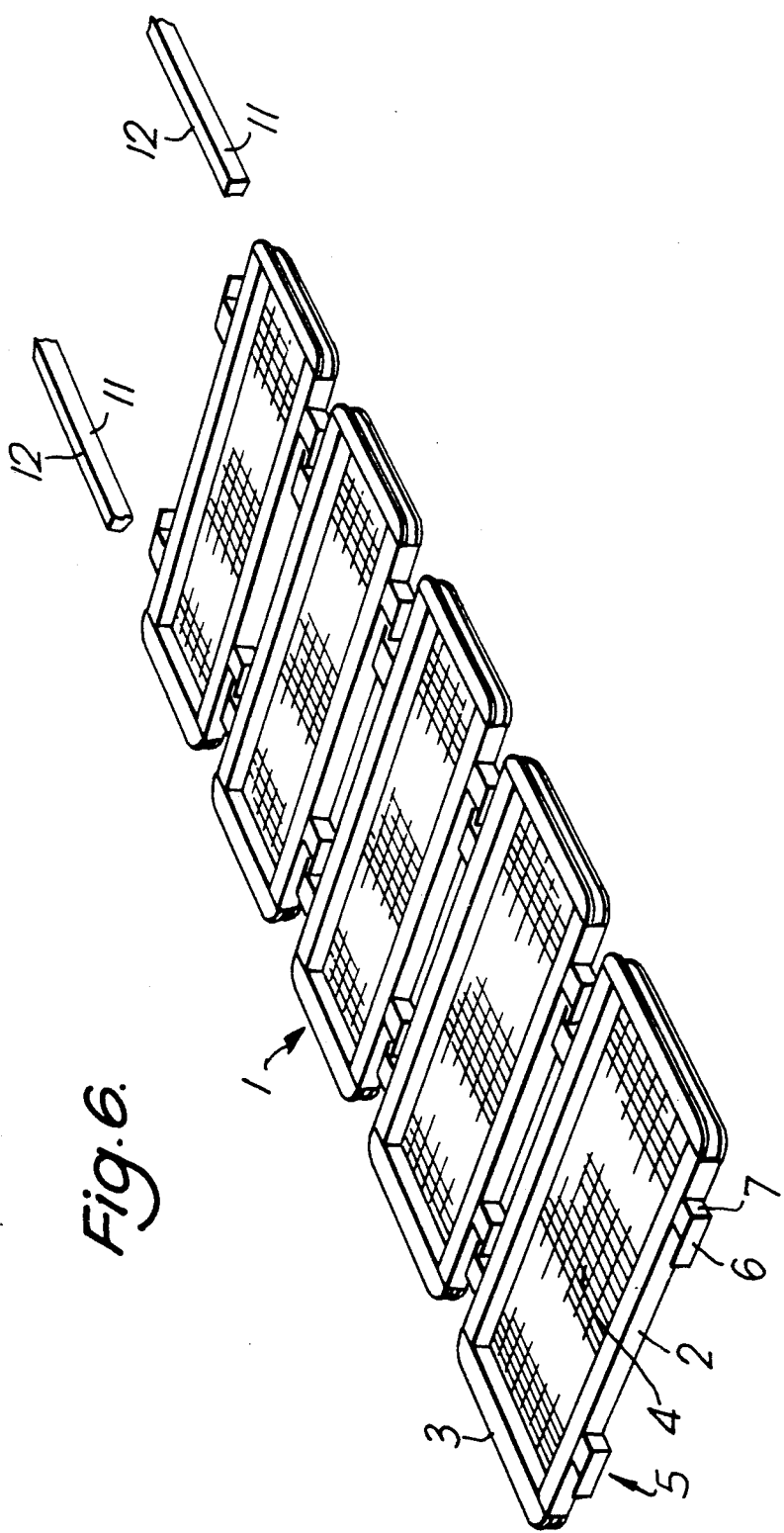

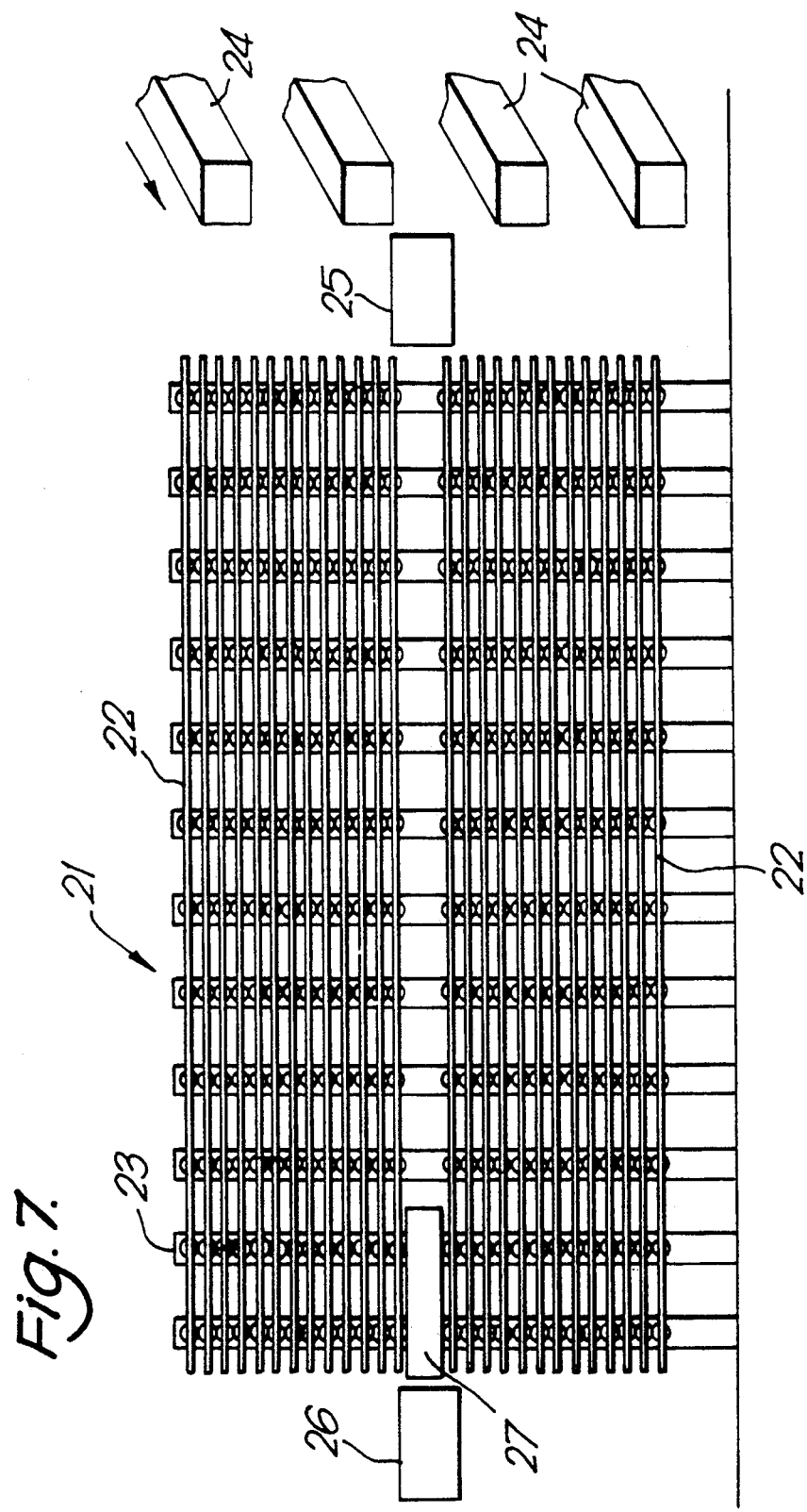

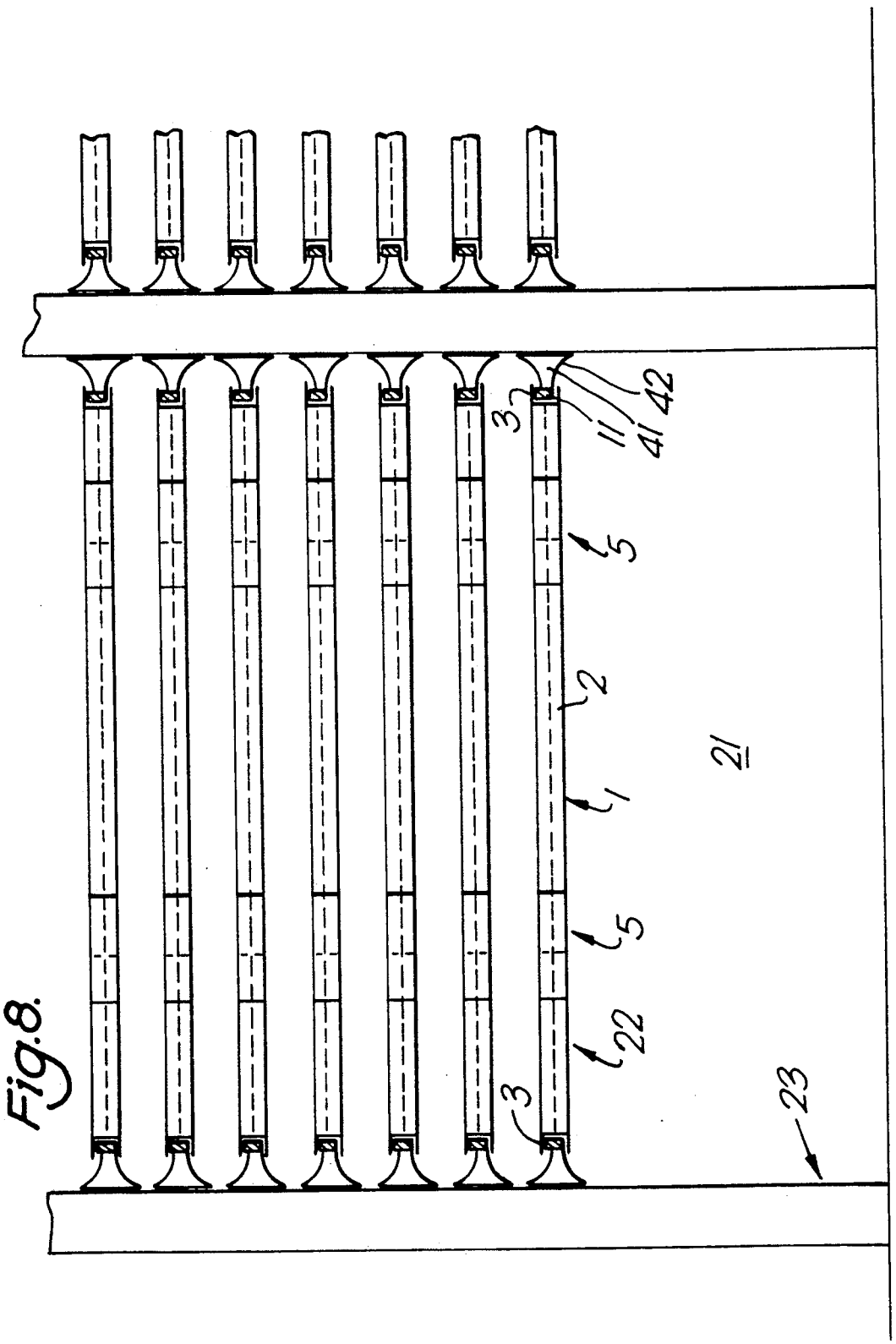

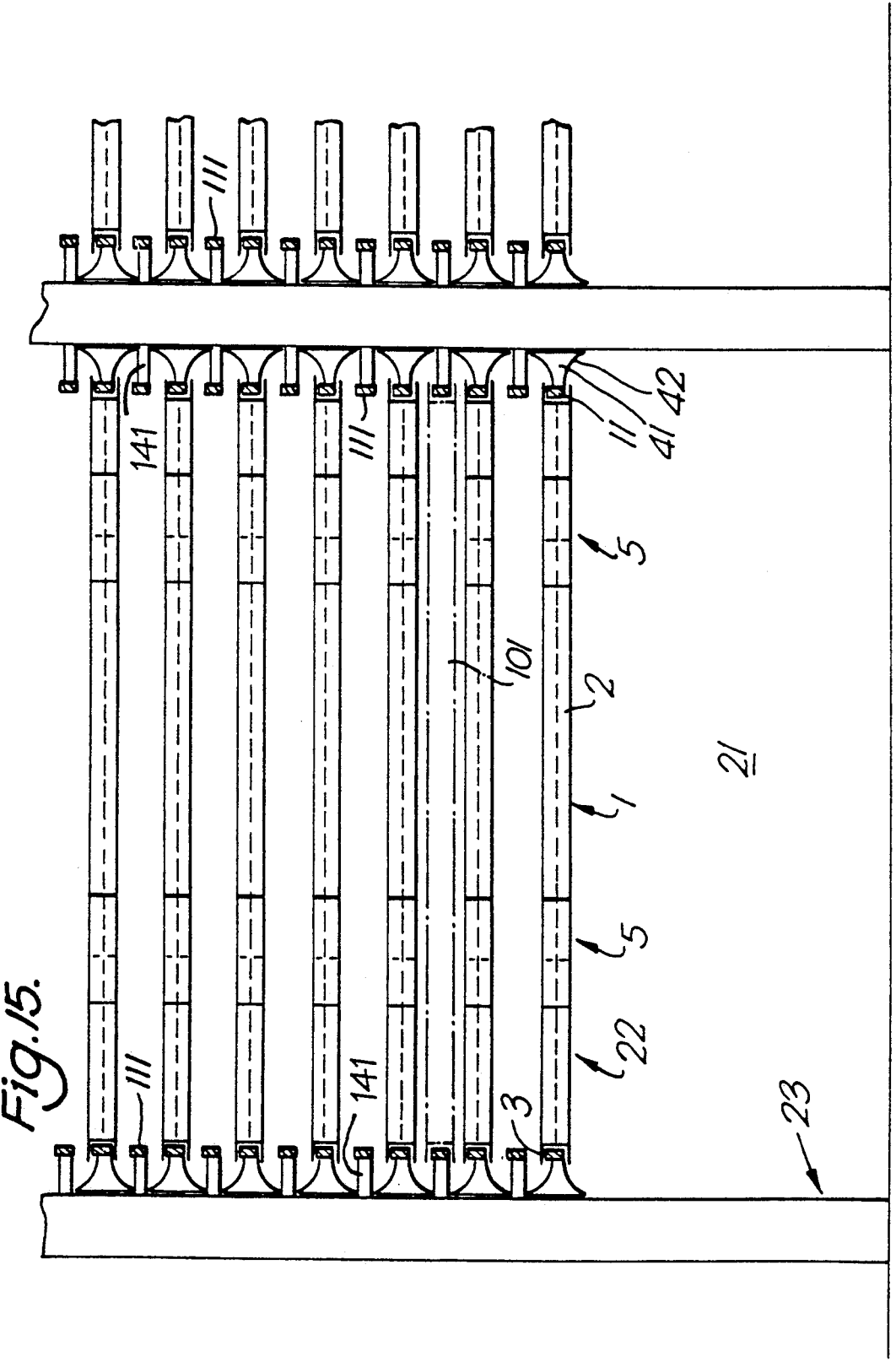

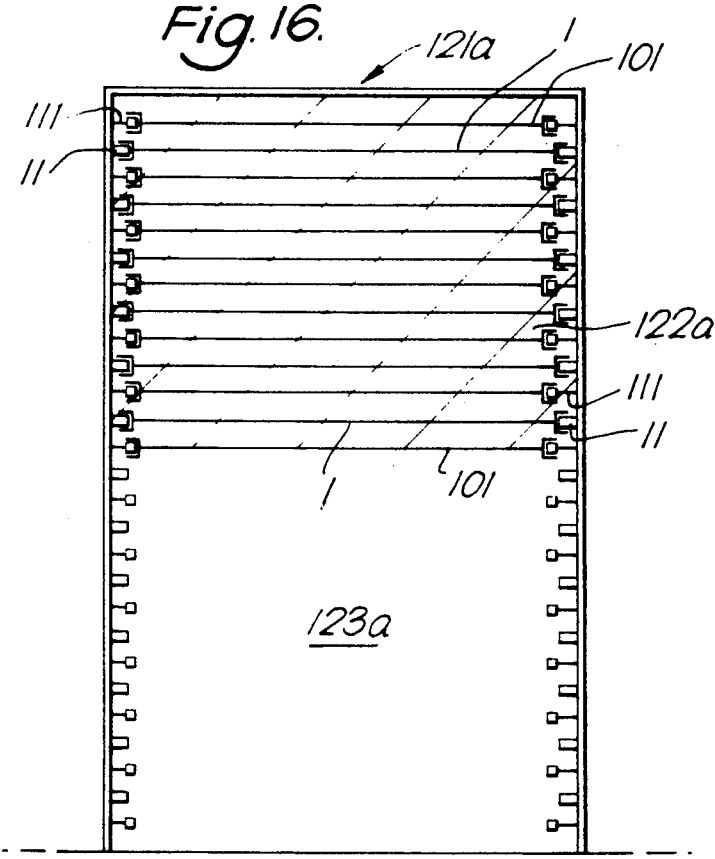
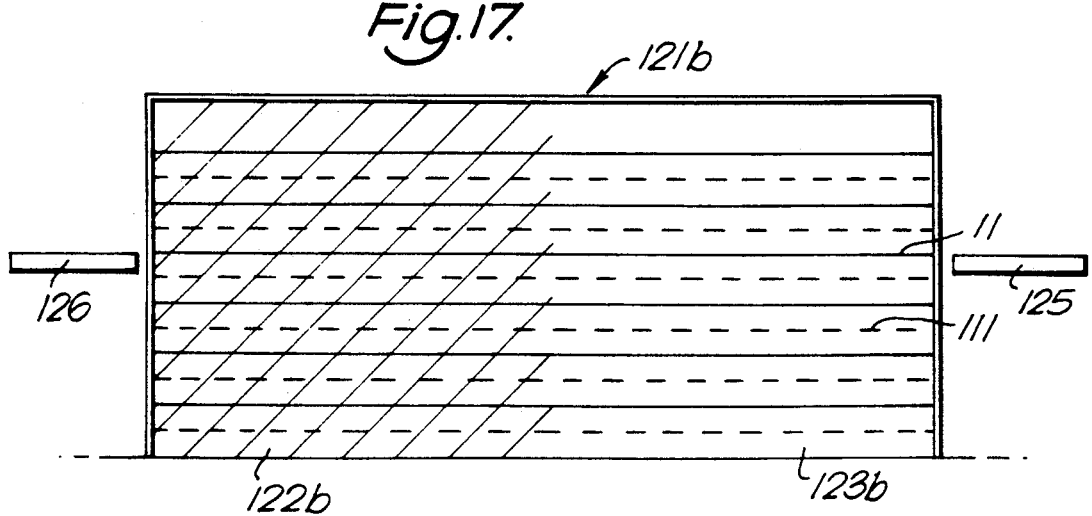

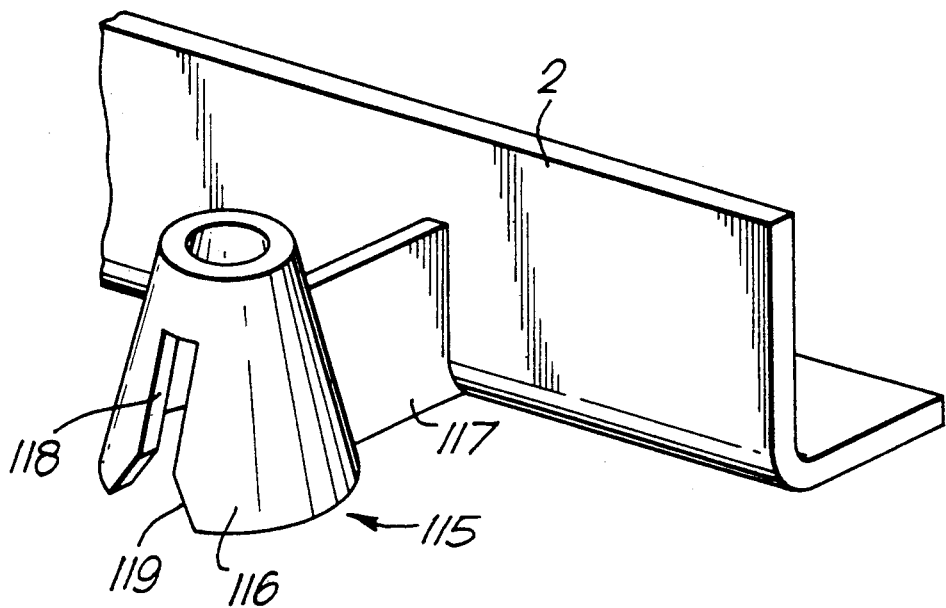

CONVEYING AND STORAGE SYSTEMS

BACKGROUND OF THE INVENTION

1. Field of the Invention

This invention relates to conveying and storage systems. In particular, the invention relates to the conveyance and storage of food products, although it is not necessarily limited to this field of activity. The invention is especially directed to systems suited to the treatment, with temporary storage, of food products, although again the invention is not necessarily limited to this field of application.

2. Description of the Prior Art

In the manufacture and processing of food products, transfer of products from one manufacturing stage to another necessarily involves a conveying system. In order to facilitate flexibility in the manufacturing process and frequently also to allow of environmental treatment of the product, a conveyance system of this kind may also include a storage region in the form of a chamber, which may or may not involve a environmental treatment step, such as cooling or heat treatment. The chamber thus defines a storage region, and optionally also a treatment stage of the processing or manufacturing operation.

The procedures involved in the manufacture and processing of food products may also include placement of food product, typically carried on trays, into an environmental treatment chamber, for temporary storage and subjection to controlled environmental conditions, such as cooling or heat treatment, to either inhibit or accelerate certain changes in the food product. A chamber of this kind thus defines a storage region, and typically also defines a treatment stage of a food processing or manufacturing operation.

Hygiene represents a significant problem in the provision of conveying and storage systems of the foregoing kind in the food processing industry. Conveyors conventionally involve either chain drive of conveying elements such as trays, or alternatively a ratchet type drive. In either circumstance, a multiplicity of moving parts must be provided to advance the food product, however supported, and the cleaning of these moving parts when located within a closed chamber represents a significant and substantial problem, as also does ensuring as far as possible that the moving parts remain free from unwanted and offensive material.

Since hygiene is of great importance in any food processing activity, closed treatment chambers of the foregoing kind for food products must be cleaned at regular intervals, in common with all food handling equipment. For this purpose, it has been the practice to clear the chamber of all product trays, which are held under ambient conditions while the cleaning procedure takes place. Thus a necessary preliminary step in any cleaning operation is to clear the storage chamber of all of the trays within it. The trays may be either placed on the floor of the premises, or alternatively, additional storage accommodation is required to hold them during the cleaning operation in the storage chamber. In either circumstances, substantial handling and space requirements prevail.

There is known a multiplicity of diverse conveying and transfer equipment, among which U.S. Pat. No. 4,475,642 relates to a system for conveying work carriers by means of engagement of driving gears provided along the sides of a path of advance for the carriers with teeth provided on the sides of the work carriers. The system described may include buffer units for intermediate storage and a variety of other features said to offer flexibility in use of the system. However, the need to provide drive gears along the length of the conveying or work carrier transfer system may render an arrangement of this kind inappropriate for a food product environment.

U.S. Pat. No. 5,012,917 discloses a transport apparatus for an assembly line for the conveyance of objects such as motor vehicle bodies. This transport apparatus includes a plurality of movable platforms positioned in end to end contact with one another. Application of a pushing force to one of the platforms by means of a drive mechanism results in this force being applied in turn to the remainder of the platforms, by virtue of their end to end engagement, thus causing them to move along the assembly line. A preferred arrangement described in this specification provides for the platforms to be carried on support rollers and driven by frictional engagement of drive wheels against side members of the platforms. End to end engagement takes place between transverse cross members of the platforms so that each front edge of a platform is engaged against the rear edge of a platform ahead of it in the succession of platforms defining the assembly line. The preferred arrangement provided for guiding the platforms during their forward movement consists of engagement of vertical axis guide rollers on the underside of the platforms against the sides of the upright central member of an inverted T-section guide rail.

A broadly similar apparatus is provided by the disclosure of U.S. Pat. No. 2,999,579. In the system described, a plurality of pallet carriers is mounted for movement along a path defined by supporting members. Each pallet carrier consists of a square block of metal having a continuous channel formed in its side edges for cooperation with guide rails extending along the sides of the path of advance of the carriers. Each of these guide rails has a laterally projecting tongue for reception in a respective channel of the pallet carrier. The pallet carriers are engaged edge to edge so that any pushing movement imparted to any of the pallet carriers will be transmitted to the remainder of the pallet carriers ahead of it arranged in edge to edge juxtaposition or engagement. A transfer device thus serves to advance all of the pallets of a sequence of pallet carriers by virtue of imparting movement to the endmost pallet of the sequence, to thereby advance the remainder of the pallets in edge to edge engagement.

In systems of the foregoing kind, the work carrying units can only be advanced in a forward direction by pushing action, since there is no positive coupling together of the pallet carriers or like units. U.S. Pat. No. 3,703,870 describes however a cargo-pallet coupler mechanism for interconnecting and thereby joining together a series of cargo-carrying pallets or containers. The coupler mechanism consists of a pair of elongated coupler rods, for use one on each side of the interface region between two pallets to be connected together. Each coupler rod has a depending key element at each of its ends for respective engagement in a corresponding pair of block elements affixed one to each pallet or container in the vicinity of the interconnecting region between the pallets, and on their side edges. The coupler mechanism thus provides a bridging bar to interconnect two pallets along their side edges, across the transverse ends of the pallets which are in face to face abutment. Two coupling links are used, one on each side edge of the pallets in their abutment region. The mechanism described is especially applicable to pallets or the like for loading in airplanes and facilitates fast removal in particular of such units from the interior of a cargo aircraft. The coupler mechanism requires however the manual placement of independent elements to interconnect pallets to be coupled together. Moreover, an interconnecting coupler unit is required on each side of each pair of pallets to be connected together.

BRIEF SUMMARY OF THE INVENTION

It is an object of the present invention to provide an improved and simplified conveying system, especially one suited to the conveyance of food products, in which the problems identified above are significantly alleviated or overcome. It is also an object of the invention to provide conveying means and components suited to use with and/or incorporation in a conveying system enabling the overcoming of the above-mentioned difficulties, especially those relating to hygiene and cleaning in conveying arrangements involving the handling of food products.

It is a particular object of the present invention to provide an arrangement for enabling a plurality of product-carrying units to be interconnected together for unitary displacement of a connected together sequence of such units. It is a further object of the invention to provide a conveyor system in which substantially automatic interengagement and disconnection of such units may be effected.

It is a further object of the present invention to provide an improved product treatment system, in particular for food products, in which an environmental treatment chamber is capable of being cleaned without necessarily requiring removal of all product-carrying units or trays from within the chamber. It is a further particular object of the invention to provide a food product treatment chamber capable of accommodating a substantially full load of product supports or trays during a cleaning operation, while yet facilitating access to the regions of the chamber to be cleaned.

According to the invention in a first aspect, there is provided a substantially rectangular product-carrying unit having edge regions extending along two opposite sides of the substantially rectangular-form unit for travelling engagement with respective guide and support rails defining guide means for travelling movement of said unit, and having coupling means for interengagement or linking of the product-carrying unit, when engaged with said guide and support rails, with or to an adjacent like unit, also engaged with the same guide and support rails, said coupling means comprising at least one coupling member provided on an edge region of the unit extending between said edge regions for travelling engagement, for interconnecting association or interengagement with a coupling member provided on said adjacent like unit.

Preferably product-carrying units for engagement with said guide means are substantially identical, at least so far as the coupling means and its manner of association with other product-carrying units is concerned. Said at least one coupling member is then suitably an engaging member and said coupling means preferably also comprises at least one receiving member for interengagement with an engaging member of another product-carrying unit, said at least one receiving member being provided on the other of the edge regions of the unit extending between said edges for travelling engagement from that on which said engaging member is provided. In a favoured arrangement, said coupling means comprises two engaging members and two receiving members. Said engaging and receiving members are preferably identical.

In a particular embodiment, said engaging member comprises a hook-shaped member provided on one of the edge regions of the unit extending between said edge regions for travelling engagement and opening in the direction of one of said side regions for travelling engagement and said at least one receiving member comprises a hook-shaped member provided on the other of said edge regions of the unit extending between said edge regions for travelling engagement and opening in the direction of the other of said side regions for travelling engagement to provide a universally interconnectible coupling arrangement, both of said edge regions of the unit extending between said edge regions for travelling engagement of the unit being identical so far as coupling with an adjacent unit is concerned. In this manner, a universally interconnectible coupling arrangement is provided, so that both of the longer sides of the tray are identical so far as coupling with an adjacent tray is concerned, i.e. the tray is not in any respect "handed".

Each hook-shaped member may have a vertical height which is approximately one half of the height of a member defining the respective said edge region of the unit extending between said edge regions for travelling engagement. Preferably each hook-shaped member has an upper edge and said upper edge is substantially aligned with the upper edge of a member defining the respective said edge region of the unit extending between said edge regions for travelling engagement.

In an alternative embodiment, said engaging member and said at least one receiving member each comprise an identical conical member. Alternatively, said at least one engaging member and said at least one receiving member are non-identical, said at least one receiving member having a recessed or apertured portion for reception of a cooperating region of an engaging member of another product-carrying unit.

In a further variant of the first aspect of the invention, the coupling means comprises at least one magnetic member provided on an edge region of the unit extending between said edge regions for travelling engagement. In a favoured arrangement, at least one magnetic member is also provided on the other of said edge regions of the unit extending between said edge regions for travelling engagement. Suitably a plurality of magnetic members is provided on each of said edge regions of the unit extending between said edge regions for travelling engagement. At least in the configuration in which at least one magnet is provided on one edge region only of the unit, at least one of said edge regions of the unit extending between said edge regions for travelling engagement is of magnetic material, suitably an opposite side to that carrying said at least one magnet.

In all embodiments in accordance with this variant of the invention therefore, said magnetic member or members are suitably provided on leading and/or trailing edges of interengaging pairs of product-carrying units and at least said edge or edges of each product-carrying unit or units may also comprise or consist of magnetic material.

In all variants of the first aspect of the invention, said unit may define a generally planar tray said edge regions for travelling engagement may be shorter sides of the substantially rectangular-form generally planar tray and said coupling means are then provided on the longer sides of the tray which extend between said shorter sides. In a favoured construction of the unit of the invention, at least one edge region of the unit extending between said edge regions for travelling engagement has an upstanding lip of a height substantially equivalent to the vertical spacing between two of said trays when supported on respective vertically spaced apart guide means. Said lip may be substantially upwardly continuous from or integral with a member defining said at least one edge region. Preferably each edge region of the unit has an upstanding lip.

According to a further feature of the invention in this aspect, each of said edge regions for travelling engagement has a surface region for engagement by a surface portion of said guide means. Said surface region may be an internal surface region of a member defining said edge region. Said member defining said edge region may be a laterally-opening channel section, or alternatively, said member defining said edge region may be a downwardly-opening channel section. In an especially favoured construction, said member defining said edge region is a longitudinally-slotted box section.

Under this aspect of the invention, the term product-carrying unit includes not only the tray-form arrangements described in the foregoing paragraphs, but also any other suitable configuration of product-supporting structure compatible with the features of travelling or sliding engagement on guide and support rails and coupling capability with other like units, to which the invention is especially directed. The term "tray" as used in the foregoing paragraphs is also to be interpreted therefore as embracing a multiplicity of product-carrying structures.

In a second aspect of the invention, there is provided a conveyor comprising a plurality of interengageable product-carrying units detachably connected to define a chain-like structure of said units and guide means for travelling movement of said units, each of the linked-together units being engaged with said guide means for said travelling movement. Preferably, at least one of said linked-together product-carrying units is in accordance with the foregoing first aspect of the invention.

At least one of a surface portion of said guide means and a surface region of said at least one unit in engagement with said guide means suitably provides low friction support for said travelling movement of said at least one unit. In a first arrangement, said guide means comprises a multiplicity of rollers, each roller defining a said surface portion and providing said low friction support. In a favoured construction, the conveyor comprises at least two substantially parallel guide and support rails, and each of said two substantially parallel guide and support rails has a low friction support surface defining said surface portion and providing said low friction support.

In a conveyor in which said at least one product-carrying unit has a longitudinally-slotted box section edge region member, each of said guide and support rails is preferably endwise engageable with a respective said longitudinally-slotted box section member of the unit for non-disengageable travelling movement of the unit along said rails.

The conveyor suitably comprises drive means for advance of product-carrying units along said guide means. Said drive means may comprise means for pushing product-carrying units forward along the conveyor guide means from an infeed end of the conveyor and/or means for pulling product-carrying units forward along the conveyor guide means towards an outfeed end of the conveyor. Said infeed and outfeed ends may be opposite ends of the conveyor, or said infeed and outfeed ends may be the same end of the conveyor.

The conveyor may comprise, at the infeed end and/or the outfeed end of the conveyor, means for effecting relative displacement of two of said units disposed in proximity to one another in a direction other than the direction of travelling movement of the units to bring about a coupling together or disconnecting action between said units. In a favoured arrangement, said units are generally planar and said means for effecting said relative displacement comprises a member for displacing at least one of said units in a direction substantially perpendicular to the plane of the units. Said means for effecting relative displacement may suitably also comprise a member for displacing at least one of said units in a direction substantially parallel to said edge region of the unit comprising said coupling means.

In a third aspect of the invention, there is provided a storage system for products accommodated on product-carrying units according to the first aspect of the invention, said storage system comprising a plurality of conveyors according to the second aspect of the invention, optionally housed or accommodated within a chamber.

In an embodiment of the system of this aspect of the invention which includes a chamber, at least one infeed conveyor may be provided for delivery of product to said chamber, along with transfer means for loading product from said at least one infeed conveyor onto a selected one of said conveyors housed within said chamber.

Said transfer means may include lift means. The storage system may also comprise at least one outfeed conveyor for removal of product from said chamber and further transfer means for advancing product from a selected one of said conveyors housed within said chamber to said at least one outfeed conveyor. Said further transfer means may also include lift means.

In a favoured construction according to this aspect of the invention, infeed and outfeed take place at opposite ends of the chamber and said conveyors extend through the chamber between said opposite ends. Alternatively, infeed and outfeed take place at the same end of the chamber. In either configuration, product loading and discharge may be effected by single or multiple input and output conveyors.

In a storage system including a chamber, the chamber may comprise a plurality of chamber portions, each of which has a plurality of said conveyors, the conveyors housed within each said chamber portion extending generally parallel to those of the other chamber portions. Alternatively, said chamber may be of modular construction, each chamber module accommodating a multiplicity of said conveyors. In any arrangement, said chamber may be an environmental treatment chamber, within which products are exposed to selected and controllable environmental conditions, such as temperature, pressure and/or humidity.

In a favoured embodiment, the chamber is a cool or chilled region in a product processing sequence. Alternatively the chamber may define a storage or buffer region operating at ambient temperature, pressure and humidity without regulation of its internal environment.

Advantages of the invention in its foregoing aspect include the ability to provide a chamber having no internal moving mechanisms, as compared with the chain drives or ratchet mechanisms of existing systems of this kind. The resulting simplification thus enables the chamber of the invention to be cleaned with great facility. All surfaces within the chamber are readily accessible, and the profiles of all sections of all mounting members and the rails in particular may be shaped to obviate the retention of contaminating matter. The invention in this aspect is especially suited to cool or hot chambers used for product treatment, in particular the treatment of food products, but the conveyor aspects of the invention are also usable in isolation in a multiplicity of manufacturing and other situations.

According to the invention, in a fourth aspect, a product treatment chamber has side walls provided with guide rails for supporting a plurality of interengageable product-carrying units, detachably connectible together to define a chain-like structure of said units, said guide rails being arranged in parallel pairs, one rail of each pair being disposed on a respective side wall, and said pairs of rails being spaced apart to enable free circulation of air between product-carrying units engaged on said rails, wherein said side walls also carry auxiliary guide rails, said auxiliary guide rails also being arranged in parallel pairs, and each pair of auxiliary rails being interposed between adjacent pairs of the first-mentioned or main guide rails, for accommodation on the auxiliary rails of product-carrying units in the regions between the product-carrying units supported by the main guide rails during cleansing of the chamber. Suitably, all of the guide rails have a low friction support surface for easy displacement of said product-carrying units when engaged thereon.

In normal use of the chamber, trays carrying food product are loaded onto the main guide and support rails, and conditions within the chamber are controlled to the required environmental criteria, whether to bring temperature down or to raise it. In addition, humidity and in some instances pressure may also be controlled. The spacing of the trays when supported on the main guide rails is such as to allow for free circulation of air between the trays and around the food products so that whatever processes are to be either inhibited or accelerated by the environmental treatment may readily proceed.

When it is desired to clean the interior of the chamber, which is particularly facilitated by the simple sliding surface guide and support rails favoured for the present aspect of the invention, these also being further adverted to in connection with those aspects of the invention first described, the auxiliary guide and support rails are brought into play. The system is first of all operated to enable removal of product from loaded units or trays. The loading or transfer means at the end or ends of the chamber is then activated to withdraw sufficient trays from each pair of main guide and support rails so as to leave one-half of the volume of the interior of the chamber free for access for cleansing. The trays removed from each pair of guide and support rails for this purpose are transferred onto the auxiliary guide and support rails, so that they are slid back into position within the environmental treatment chamber in what are normally the air spaces between trays in normal use of the chamber. Thus one-half of the number of trays normally accommodated within the chamber are interleaved as it were between the contents of the other half of the chamber. The result is a tight array of trays supported on both the main guide rails and the auxiliary guide rails with minimal air spaces between them.

This interleaving may take place in one or other of two manners. In a first arrangement, all of the trays may be placed in either the upper or the lower half of the chamber. Preferably, the procedure is that all of the trays are first of all interleaved in the lower half of the chamber and the upper half is cleaned. The trays are then moved into the upper region of the chamber, and the then exposed or cleared lower half of the chamber is cleaned in turn. Alternatively, all of the trays may be moved to one end region of the chamber. The first half of the chamber extending from the other end region is then cleaned. After this first cleaning step, all of the trays are next moved back into the cleaned region to enable cleaning of the second region thus exposed. The essence of the invention is that for cleaning purposes, the trays are packed in a tight array with little or no clearance between them. Thus the air space normally available between trays to accommodate product during treatment and to allow free circulation of air for treatment purposes is used during cleansing to accommodate a tightly packed array of product-carrying units or trays.

Irrespective of the manner of interleaving, on completion of the tray transfer operation, the other half of the chamber is then available for free access for staff to enter and undertake whatever cleaning operations are required. The system of the invention offers the major advantage over conventional cleaning procedures that the product trays do not require to be removed from the environmental treatment chamber. Substantial savings in handling and space requirements are thus achieved.

In the case of interleaving in an endwise manner within the chamber, when the first half of the chamber has been cleaned, the transfer mechanisms can then be used to transfer all of the product trays to the opposite end of the chamber, i.e. that which has just been cleaned. The cleaning procedure then takes place in similar manner in the further region of the chamber now released for access. Following completion of all cleaning operations, the trays can then be retransferred onto the main guide rails, and normal conditions are restored, ready for product to be loaded onto the trays.

According to the invention in a final aspect, there is provided a product treatment system comprising a chamber according to the fifth aspect of the invention. Alternatively, the product treatment system according to this aspect of the invention may comprise a chamber having side walls provided with guide rails for supporting a plurality of interengageable product-carrying units detachably connectible together to define a chain-like structure of said units, said guide rails being arranged in parallel pairs, one rail of each pair being disposed on a respective side wall, and said pairs of rails being vertically spaced apart to enable free circulation of air between product-carrying units engaged on said rails, a multiplicity of product-carrying units according to the first aspect of the invention and control means for regulating at least placement of said product-carrying units within said chamber. Said control means is preferably further adapted to regulate environmental conditions within the chamber.

In a system of the foregoing kind, product is preferably delivered to the chamber by at least one infeed conveyor for advance of product-carrying units to the chamber and loaded onto a selected pair of guide rails within the chamber by transfer means. The system suitably also comprises at least one outfeed conveyor for removal of product-carrying units from the chamber and transfer means for advance of product-carrying units from a selected pair of said guide rails within the chamber to said at least one outfeed conveyor. Infeed and outfeed may take place at opposite ends of the chamber, or the product loading and discharge operations may be carried out at the same end of the chamber. In particular, product-carrying units may be advanced into and withdrawn from the guide rails within the chamber for loading and removal respectively by way of a single feed conveyor and lift.

In a system according to this fifth aspect of the invention drive means are preferably provided for advance of product-carrying units along the guide rails, said drive means including pushing means for moving the units forward along the guide rails from an infeed location and/or pulling means for withdrawing units from the guide rails towards an outfeed location. In a particular embodiment of the invention in this aspect, the pushing and pulling means are combined and are at the same end of the guide rails in a single-sided installation.

BRIEF DESCRIPTION OF THE DRAWINGS

Embodiments of the invention will now be described having regard to the accompanying drawings, in which FIG. 3 is a fragmentary view showing a suitable section for guide and support rails of a conveyor according to the invention and the manner of engagement of the tray of FIGS. 1 and 2 thereon, FIGS. 4(a) to 4(d) are diagrammatic end sectional views of alternative rail and tray side section configurations, FIG. 5 is an enlarged fragmentary pictorial view of interconnecting or coupling arrangements according to the invention as provided on trays according to FIGS. 1 and 2, FIG. 6 is a pictorial view of a chain of interlocked or coupled-together trays according to FIGS. 1, 2, 3 and 5, FIG. 7 is a diagrammatic side sectional view of a storage installation according to the invention, with infeed conveyors shown in diagrammatic pictorial manner, FIG. 8 is an enlarged fragmentary end sectional view of the installation of FIG. 7, showing the manner of engagement of trays on guide and support rails within the chamber, FIG. 15 is an enlarged fragmentary end sectional view of a storage installation according to the invention, showing the manner of engagement of product-carrying trays on main guide and support rails, together with the locations of auxiliary guide rails and the manner of support of trays on these rails also, FIG. 16 is a diagrammatic representation in end view of a chamber arrangement in accordance with the invention, identifying a first region available for cleansing during use of the system of the invention in a first cleansing strategy, FIG. 17 is a diagrammatic representation in side view of a chamber arrangement in accordance with the invention, identifying a region available for cleansing during use of the system of the invention in accordance with a second strategy, FIG. 18 is a pictorial view of a conical formation of coupling means for interconnecting trays or product-carrying units according to the invention.

DETAILED DESCRIPTION OF THE DRAWINGS

Figure 1:
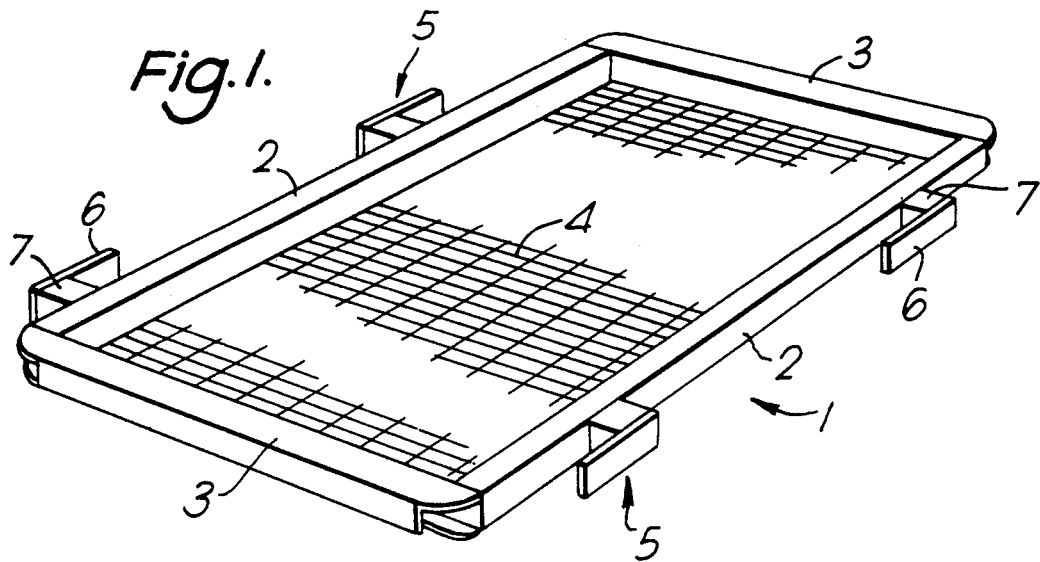
FIG. 1 is a pictorial view of a tray according to the invention.
Figure 2:
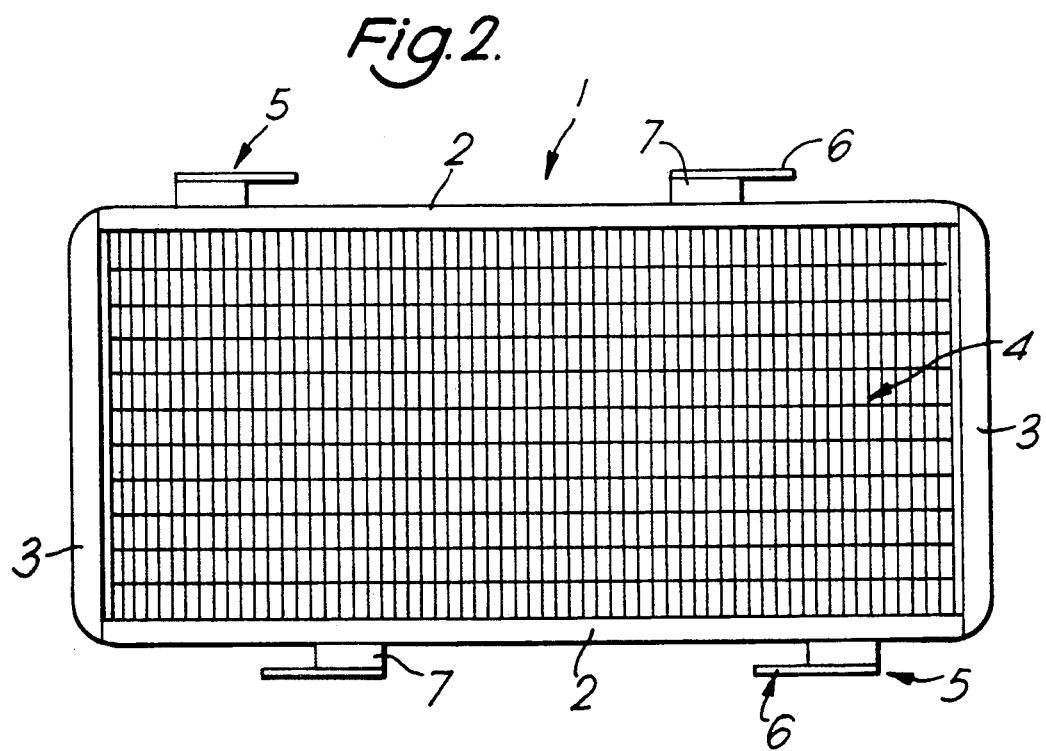
FIG. 2 is a top view of the tray of FIG. 1.

As shown in FIGS. 1 to 3, the product-carrying unit in accordance with the invention is provided in the form of a tray 1, suitable for use in a conveyor according to the invention. The tray 1 has a peripheral frame, the longer sides 2 of the generally rectangular-form tray being of rectangular-section material and the shorter sides 3 being formed of longitudinally-slotted box-section material. Within the frame 2, 3, a floor or base 4 is defined by a region of mesh material. The mesh-form base 4 may be fixedly retained within the frame 2, 3, or it may be floatingly arranged in a vertical direction, to enable upward and downward movement of the base 4 relative to the frame to facilitate the loading and removal of product onto and from the surface of the tray 1.

The invention is not in any way limited to the tray-form product-carrying unit shown in FIG. 1. In particular, the product-carrying unit may take the form of any other product support structure, such as a pallet or contoured frame. Furthermore, even within the tray-form construction, the supporting surface may be formed by a plate material or the like, rather than the mesh arrangement depicted in FIG. 1. Similarly, the elongate frame members of the tray or other product-carrying unit may be formed from materials of sections other than those shown in FIG. 1.

The construction of the shorter longitudinal sides 3 of the tray from longitudinally-slotted box-section frame portions serves to allow the tray 1 to be received and supported on longitudinal guide and support rails forming part of a conveyor also in accordance with the invention, in a manner subsequently to be described. This configuration of the side frame portions also allows the trays to be locked onto the guide and support rails, so as to prevent the tray coming adrift during its travelling movement. This locking feature is also described further below. When received on guide or support rails of this kind, the trays 1 may then be coupled or linked together by coupling means 5 provided on their longer longitudinal edges 2, so as to form a continuous linked chain or array of trays supported on the guide and support rails. The coupling features of the invention are also shown in FIGS. 1 and 2 and in more detail in FIG. 5.

In FIG. 3, the configuration of the guide or slide rail is shown, the guide rail 61 being defined by a shaped section of elongate plate or strip material 62, bent into the shape of a shallow "S" or "Z", turned on its side as seen in FIG. 3, with a central web 62a and appropriately-directed end flange portions, 62b and 62c. One, 62b, of these end flange portions is affixed to the interior of a wall 31 of a chamber by appropriate support arrangements 63. The central web 62a extends upwardly from the lower or wall-mounting flange portion, 62b, in a direction also extending away from the inner surface of wall 31. The other or free end flange portion 62c from that 62b affixed to the wall is then disposed to extend substantially vertically, and the upstanding free edge region with which flange portion 62c of rail 61 terminates is covered over with an inverted U-shaped section 64 of low friction material. The longitudinally-extending guide or support rail 61 thus defined by the elongate strip or narrow plate section 62 projects into the longitudinally-slotted box-form side-section 3 of the tray through longitudinal slot 65, so that low-friction section 64 supports the tray by bearing on the underside 3e of the upper interior web or channel of the slotted box tray-frame member. The locking-on feature will also be apparent from FIG. 3. Longitudinal slot 65 is defined between a laterally-extending lower horizontal lip portion 66 of the cutaway or slotted box-section and an upper downwardly-directed vertically-extending lip portion 67. The transverse dimension of slot 65 is insufficient to allow withdrawal or displacement of the rail and head structure 61, 64 outwardly through the slot. Thus positive retention or locking-on of the trays 1 onto the guide and support rail 61 is achieved, and the trays may only be advanced onto or displaced forward from the guide and support rails 61 at the longitudinal ends of the rails. Thus any vertical or sidewise displacement of the tray leading to disengagement of the underside 3e of the upper web of the box-section 3 from the top or sliding surface of low-friction rail portion 64 does not lead to detachment of the tray 1 from the rail 61, and there is similar security against any lateral or sidewise dislodgement.

It is important that the upper supporting surface of the rail, on which the trays slide, should facilitate easy displacement of the tray, with minimal frictional resistance. For this purpose, the upper surface of the rail may be defined by a low-friction material, or the rail may be treated to provide such a low-friction surface. Alternatively or in addition, the lower surfaces of the upper flanges or webs of the side rails of the trays which rest on the upper surface of the rail may also be formed for ease of sliding displacement of the trays. In this manner, by virtue of the tray being readily displaceable along the rail, on account of the low friction relationship prevailing between the trays and the rails on which they are carried, the trays when coupled together to define a conveyor according to the invention, can readily be advanced along the rails by a conventional transfer mechanism operating in conjunction with a likewise conventional lift at either the infeed or outfeed end of the conveyor, or at both ends. The invention thus enables dispensing with any kind of drive along the length of the conveyor. The coupled together trays are driven in unison from the ends of the conveyor. Thus a low-friction rail/tray relationship is of importance to the present invention.

This present embodiment of the guide rail and the carrying unit frame represents only one of a diversity of possibilities of construction afforded by the present invention. Four further but non-limiting arrangements are shown in FIGS. 4(a) to 4(d). In FIG. 4(a), the side section 3a of the tray is defined by an outwardly opening member of C-profile, the mouth of the C-section or channel opening laterally of the tray in an outwardly directed manner. The guide and support rail 61a is received within the channel 3a, to engage the undersurface of the top flange of the C-section frame member for support and guidance of the tray by means, in this instance, of a multiplicity of rotatably-mounted rollers 64a, rather than low friction sliding contact material. The rollers 64a fulfill the requirement of facilitating easy travel of the trays along the guide and support rails, in a substantially friction-free or very low friction manner. In FIG. 4(b), a substantially inverted construction is provided, in which the guide and support rail 61b has an inwardly directed C-section slot defined in its side surface, opening towards the edge of the tray, within which a single side flange 3b of the tray is engaged for support and guidance of the tray during travelling movement. Reduced friction between the guide and support rail and the trays is achieved by interposition of a suitable low-friction material between rail and tray flange or by use of suitable rollers.

The arrangement in FIG. 4(c) represents a variant on the longitudinally-slotted configuration of FIG. 3, in which a downwardly-opening C-section side frame member 3c is engaged by an upwardly-directed low-friction support portion 64c of side rail 61c. Thus in this case the longitudinal slot is effectively defined by the downward opening of the C-section frame portion, but a locking-on or retention feature is not provided. A further variant is shown in FIG. 4(d), which is somewhat similar to that of FIG. 4(c), but in which the open lower portion of a laterally-oriented C-section frame portion 3d is partially closed by a lip section 67d, to define a longitudinal slot 65d somewhat similar to that of FIG. 3, but defined entirely on the lower surface of the side frame member. Locking-on retention of rail structure 61d, 64d may again be provided by appropriately dimensioning the transverse width of the longitudinal slot 65d. In the arrangements of FIGS. 4(c) and 4(d), the C-section member 3c and the lipped C-section 3d respectively effectively equate to the slotted box of FIG. 3, with, in FIG. 4(c), the entirety of the lower web or flange removed and, in FIG. 4(d), a portion of the lower flange or run of the section cut away to define slot 67d. This arrangement differs from the removal of portions of both the bottom and one side region of the box, provided in the arrangement of FIG. 3 to define an elongate corner slot 65 located along an edge of side-section 3 where two notional box-defining portions converge. Still further arrangements are of course also possible.

Referring now to FIG. 5, taken together with FIGS. 1 and 2, the couplings 5 are defined by generally planar or plate-form material portions 6 affixed to the longitudinal sides 2 of the tray 1 at an outward spacing from these sides, so that each coupling material portion 6 defines together with an associated spacing mounting portion 7 a generally hook-shaped member, the opening of the hook 6, 7 being directed towards one of the shorter sides 3 of the tray, for the two coupling members disposed on one of the longer longitudinal sides 2, and the openings of the hooks 6, 7 on the other longitudinal side of the tray 1 opening towards the opposite shorter side 3 of the tray 1. Thus the hooks 6,7 on the leading or near edge 2 as shown in FIG. 1 open towards the front or nearer side edge 3, with the hooks 6,7 of the rear or more remote longer edge or side 2 as represented pictorially in FIG. 1 open towards the rear or more remote side edge or region 3 as indicated in this drawing. In this manner, a universal coupling arrangement is provided, in which each longitudinal side 2 of the tray 1 may be coupled to either longitudinal side 2 of any other tray 1, and there is no question of the trays having in any sense a "handed" coupling arrangement.

An array of linked together trays 1 on guide and support rails 11 is shown representationally in FIG. 6. The trays are provided with C-section end frame portions, of the kind shown in FIG. 4(a), for clarity of representation rather than as indicative of any preferred construction. The guide rails 11 are defined by elongate members extending in a desired direction of travel for the trays 1 and spaced apart transverse to that direction so that when the trays 1 are placed on the guide rails 11, a respective guide rail 11 is located between each C-section shorter end frame portion 3 of the tray 1, to support and guide the tray during its movement. Preferably, the upper surface 12 of each guide rail is coated with or consists of a low friction material, such as a suitable plastics material, so that tray to rail friction may be substantially minimized and the trays can readily be slid along the guide rails. Alternatively, reduced friction may be achieved by other arrangements or means, and in particular, roller means may be provided to achieve this ready travel of the trays along the rails.

A particular feature of the present invention is the absence of any kind of drive mechanism whatever, either on or associated with the guide rails 11, for advancing the trays along the rails. Instead, each tray 1 as it enters onto the guide rails 11 is coupled with the preceding tray thereon, so that all of the trays extending along the length of the guide rails together form a linked together chain or sequence of trays. Because the trays are linked together, they may therefore be either pushed or pulled as a complete unit along the slideways defined by the guide rails from one end of the conveyor system for which the guide rails form the supporting surfaces, to the other end of the system. Thus a conveyor in accordance with the invention may be defined by a group of trays of the invention, coupled together to provide a product-carrying array or surface, and supported for travelling movement or advance by guide and support rails. The travelling engagement is especially advantageously provided by a low-friction sliding construction in which no moving parts are present either on the tray or on the rails.

Because of this absence of any moving parts whatever, this type of conveyor arrangement and the associated trays are especially suited to use in food processing installations, where cleaning and freedom from accumulation of contaminating material is a highly desirable requirement. The conveyor of the system is especially suited to a food treatment or processing installation in which trays supporting food products are accommodated in a chamber which serves for a treatment step, by virtue of the environment within the chamber being controlled, such as by heating or cooling. Alternatively, such a chamber may serve a purely buffer function, to hold a quantity of partially-processed product between successive stages of a manufacturing operation, either with or without environmental control of conditions within the chamber. FIGS. 7 and 8 show features of a storage installation according to this aspect of the invention.

As shown in FIG. 7 in side sectional view, the storage installation or system 21 has a multiplicity of conveyors 22 each defined by longitudinal parallel rails 11 supported by upright members 23. The guide rail arrangement and the spacing and disposition of the rails 11 is shown in more detail in the end view of FIG. 8. As can also be seen in FIG. 8, each tray 1 is supported between the spaced apart guide rails 11 by virtue of C-section shorter end frame portions 3 being slid onto the guide rails, although alternative cooperating configurations of tray edge section and guide rail are again available, as previously set forth, and the C-section arrangement does not necessarily represent the most-preferred embodiment. It will also be apparent from FIG. 8 that the absence of any kind of drive mechanism means that the guide rails 11 can be located closer together as to their vertical spacing, while the advantages from the cleaning point of view will be immediately apparent. Rails 11 are mounted on uprights 23 by means of members 41 which butt flush with the vertical surfaces of the uprights and provide smoothly curving external surfaces 42 merging onto the upright surfaces without any dirt traps. As subsequently further discussed, a flush internal surface for the chamber wall can readily be provided by appropriately filling in the regions between the uprights 23 with a suitable material, to define a smooth inner wall facilitating cleaning of the chamber in a convenient and accessible manner.

Referring now once again to FIG. 7, at one end of the conveyor, a multiplicity of infeed conveyors 24 is provided, the conveyors 24 feeding products carried on trays according to the invention into the system in a sidewise manner perpendicular to the plane of the drawing, as indicated diagrammatically. Trays are removed from these infeed conveyors 24 by a lift 25 at the infeed station, which moves up and down and transfers the trays from the infeed conveyors to selected conveyor levels within the chamber 21. As the trays are slid onto the rails of the appropriate conveyor level, they are linked or coupled together in a manner to be subsequently described. As each additional tray is pushed into a level already accommodating a plurality of trays, it couples onto the preceding tray, and a drive mechanism of known kind provided on the lift 25 pushes all of the trays on that particular level forward towards the other or outfeed end of the conveyor.

At the output end, an alternative conveyor arrangement is shown, but nonetheless, substantially the reverse operation takes place to that at the infeed station. For the removal of a tray from a particular level, that tray is engaged by the transfer mechanism of an outfeed lift 26. The final tray is then pulled forward, again substantially in known manner, during which operation all of the remaining trays to the rear along that particular level are also advanced forward, by virtue of their being coupled together to define a conveyor according to the invention. As the advancing movement comes to an end, the tray to be removed is uncoupled from the following trays and taken away by the lift 26 to a single outfeed conveyor 27 located within the storage installation itself, for removal in the lateral or sidewise direction. Significant advantages reside in locating the conveyor within the actual storage region itself, in that the transfer mechanisms for displacement of trays or product-carrying units between the conveyor rails and the lift are greatly simplified, the disadvantage being the loss of a small number of conveyor levels or tiers, typically only one or two. A particular advantage resides in lift 26 being able to cooperate with outfeed conveyor 27 in substantially the same manner as it is called upon to interrelate with the various conveyors 22 of the invention at the various levels of the chamber. The sliding conveyor arrangements provided by the invention also enable substantially conventional tray placement and withdrawal mechanisms to handle trays in accordance with the present invention. Action in regard to each end tray is essentially similar to that taking place in conventional systems with tray drive within the chamber, but the low friction arrangement of the present invention enables the simultaneous associated advance or displacement of all of the interlinked trays defining the conveyor of the present invention without any necessity for internal drive means within the chamber.

It will be apparent that in order for trays to be immediately removable from any given level, the leading tray on that level must be at the outfeed end of the conveyor and within reach of the discharge lift 26. If there are insufficient loaded trays of product on any one level to bring the leading loaded tray to the output end, then this situation can nonetheless be achieved at the outfeed end by feeding trays in at the infeed end in sufficient number to bring the first loaded tray to the required end or discharge position at the output end. Empty trays may be used for this purpose as required. The system is thus exceedingly flexible, in that by appropriate design of the feed conveyors and transfer mechanisms at each end, trays can in fact either be brought up to or away from either the infeed or the outfeed end, by pushing or pulling at either end. Further advantages of this aspect of the invention will become apparent in relation to a variant subsequently to be described.

Thus in an advantageous adaptation, both ends of installation 21 can be both infeed and outfeed ends, and the handling arrangements for the trays at each end may comprise both pushing and pulling features, for advance of trays from either end inwards into system 21 and likewise for withdrawal of trays from installation 21 at either end. Thus either end may serve for infeed or outfeed, as required.

As already briefly noted, the arrangements shown in FIGS. 7 and 8 may easily be adapted to provide an enclosed storage chamber in accordance with the principles of the invention, by filling in the spaces between the upright stanchions 23 supporting the rails with suitable material. If the chamber is required to fulfill an environmental treatment function in a processing system, then the infill material may be a suitable insulant.

Figure 9:
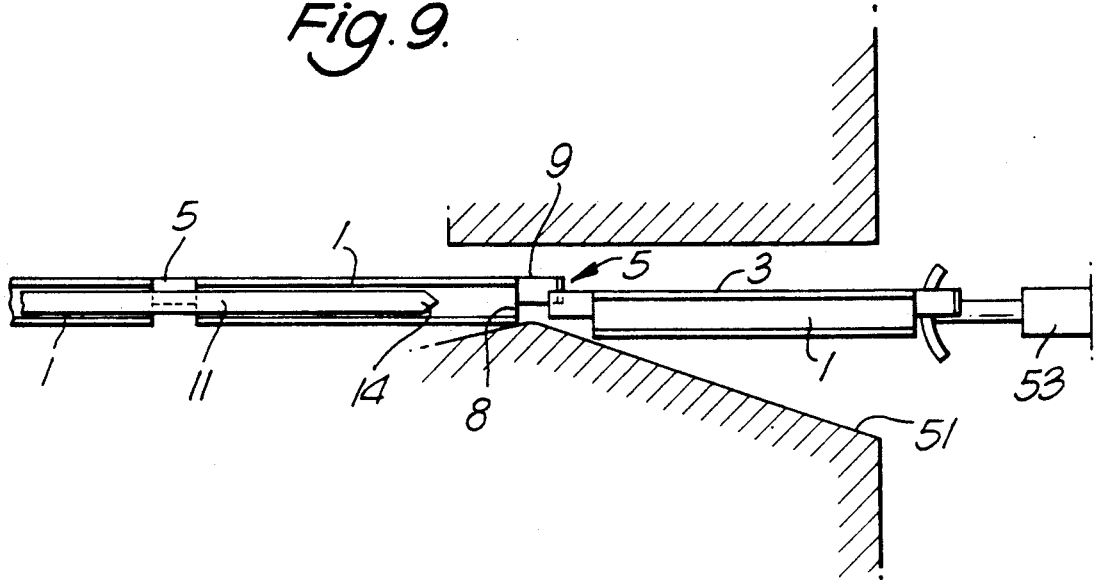
FIG. 9 is a side sectional diagrammatic view showing one manner of coupling trays together at the infeed end of a conveyor in accordance with the invention.

A diversity of arrangements and mechanisms may be provided for coupling the trays together as they enter the conveyor rails and for disconnecting them at the downstream end of a conveyor system. An advantageous and relatively simple and straightforward arrangement is shown in schematic side view and top view respectively in FIGS. 9 and 10. As shown in FIG. 9, for this purpose each coupling member 5 is in this construction generally hook-shaped and has a vertical height which is substantially one half of the height of the rim 8 of the frame of the tray, and the upper edge 9 of each coupling member is substantially aligned with the upper edge of the peripheral rim 8 of the tray, as compared with the full-height coupling members of FIG. 1 to 4, which are of the same vertical dimension as the rim 8 of the tray. As shown in FIG. 9 in particular, vertical alignment or guiding of the tray 1 onto the guide rails 11 is brought about by the tray, as it is advanced from a lift or other input unit, sliding upwardly along an inclined ramp 51, until the C-shaped end section portions 3 of the frame of the tray are driven onto the end of a respective guide rail 11, over an expandingly tapered lead-in portion 14 of the rail. The slope of the guide ramp 51 is selected in conjunction with the breadth of the opening of the coupling member, i.e. the spacing between the longitudinal side edge 2 of the tray and the plate portion of the generally hook-shaped coupling, so that as each tray is driven inwardly and upwardly along the ramp 51 by drive means 53, as it approaches the preceding tray already accommodated on the guide rails, the upper leading edge of each of its half-height members 5 moves in under the outermost rear edge of each corresponding half-height coupling member 5 of the preceding tray. As advance of the tray continues, the tray is driven further upwards along the ramp, so that the claw or hook portions of the leading coupling members of the arriving tray are then engaged within the corresponding portions of the rear side couplings of the preceding tray, in locked together manner. As the leading edge of the incoming tray rises to the level of the upper edge of the preceding tray already on the guide/support rails, the couplings of the two trays enter into a fully engaged condition. When the trays are then pushed or pulled along the guide rails, the coupling members remain locked together and there is no possibility of their coming apart while they are retained on the guide and supporting rails.

Figure 10:
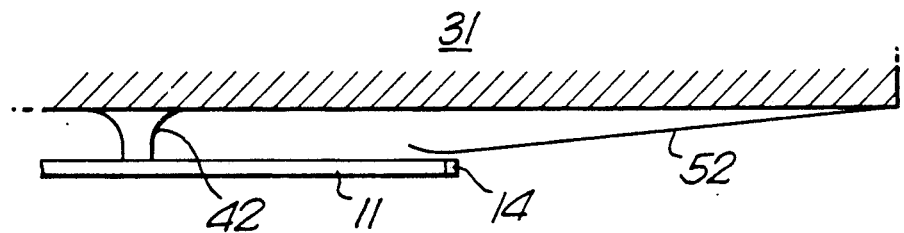
FIG. 10 is a top view of the coupling region of FIG. 9.

The top view of FIG. 10 shows side ramps 52 or lateral sloping lead-in surfaces of the coupling region for rails mounted on a wall 31, by virtue of which the trays are guided onto the guide rails in the sidewise direction, while also being subjected to the upward coupling displacement brought about by the upwardly inclined lead-in ramps 51 which govern tray displacement in the vertical direction in the infeed region. In this instance, guiding movement is relatively straightforward, and the only governing criterion is that in the last stage of tray advance, as each tray comes into contact and engagement with the previous tray, the lateral alignment should be such that the coupling action will take place in an appropriate manner. Thus side ramps 52 effect a substantially centralising function in this instance.

The coupling together of the trays may also take place in a diversity of other manners, including inter alia, a downwards relative displacement at the coupling stage or also a lateral movement. Vertical coupling engagement enables the provision of coupling features on the supporting sides of the frame of the tray as well as on the longitudinal sides, so that the same drive and coupling arrangement can be used for sidewise tray displacement also, as well as the advancing displacement already described. However the upwardly directed ramping arrangement described in which upward movement is combined with tray advance is relatively simple and straightforward and is particularly effective in conjunction with the half-height coupling members described in regard to FIGS. 9 and 10, although it will also be appreciated that the technique in question is not necessarily limited to coupling members of this configuration, as coupling members of different heights may be accommodated by appropriate choice of the angle of the ramp 51 incline and of the coupling member dimensions themselves.

It will also be appreciated that uncoupling or disconnection of the trays at the discharge end of the conveyor or system may be effected by reverse operations and arrangements to those described in respect of the coupling together at the infeed end.

Figure 11:
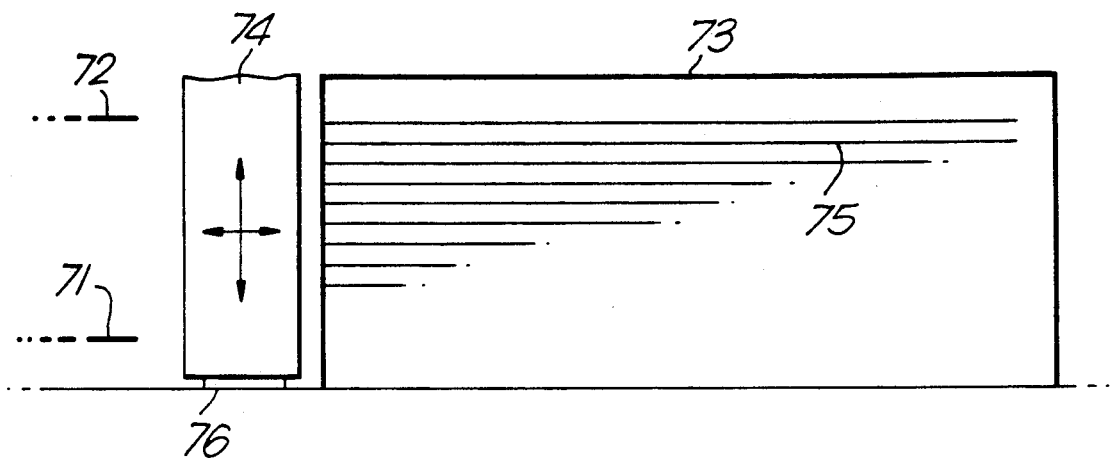
FIG. 11 is a diagrammatic representation in side view of a single-sided storage installation in accordance with the invention, especially suited to the provision of a modular storage chamber arrangement.
Figure 12:
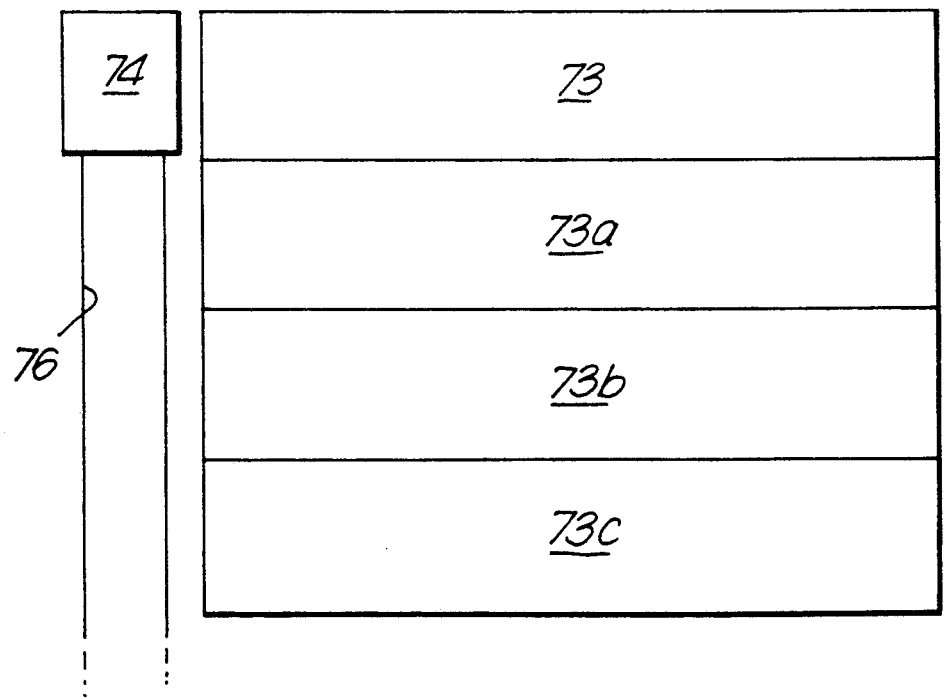
FIG. 12 is a top view of the installation of FIG. 11.

FIGS. 11 and 12 show in side and top view, a single-sided installation especially suited for modular storage purposes, as opposed to product treatment. As shown in these drawings, product arrives on an infeed conveyor 71 and leaves on an outfeed conveyor 72. It is transferred by means of a conveyor lift unit 74 to storage accommodation defined within a chamber 73 by a multiplicity of guide rails 75 adapted to support trays according to the invention. Product bearing trays are conveyed from the infeed conveyor by the lift to an appropriate selected one of these sliding rail conveyor or storage units defined within the chamber by the combination of rails 75 and units or trays according to the invention and are subsequently removed again, from the same end of the chamber, by the transfer mechanism/lift, for delivery to the outfeed conveyor. In this construction of the invention, trays being loaded into the installation are advanced by being pushed by the lift/transfer mechanism into the appropriate level of the sliding storage system. For removal, the trays are brought back to the same end by being pulled. The coupled-together trays which define the internal conveyors of the storage chamber are readily suited to an installation of this kind.

As shown further in FIG. 12, the installation may be expanded in modular manner from a single chamber arrangement by a succession of chambers 73a, b, c being added alongside chamber 74 to expand the capacity of the system. Loading and discharge of the additional storage modules may be effected by lift 74 being mounted on rails 76 for lateral travel so that it may be aligned with a selected one of chambers 74, or 74a, b, c.

Figure 13:
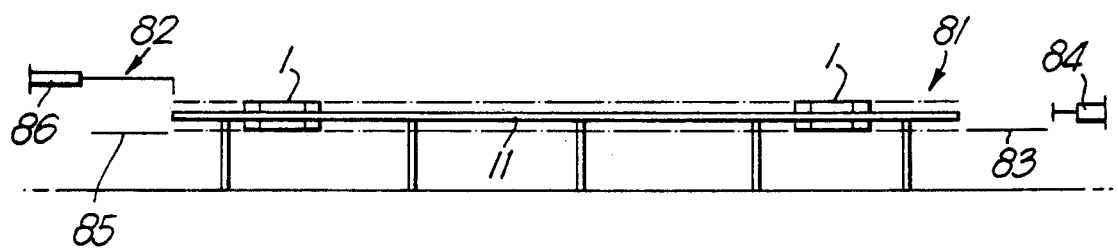
FIG. 13 is a schematic representation in side view of a simple conveyor in accordance with the invention, not associated with any chamber housing.

The very simplicity of the invention in its various aspects lends the conveyor provided by the invention a facility for use in a multiplicity of circumstances other than food processing and food treatment chambers or buffer storage. FIG. 13 shows a simple conveyor system for general purposes, in which two guide rails 11 are supported in an open or non-enclosed environment for advance of trays 1 from a feed station 81 to a delivery station 82. The loading/transfer mechanism 83 with pusher 84 at the infeed end may entirely suffice to advance trays to the outfeed end 82, and it may not be necessary to provide any pulling device for advance or withdrawal of the trays at the delivery end. However, an optional discharge mechanism 85 and puller 86 are indicated diagrammatically in FIG. 13. In an exceptionally simple installation, the use of hand movement of the trays, without any mechanical feature whatever at either end so far as drive or advance is concerned, may also be envisaged.

Figure 14:
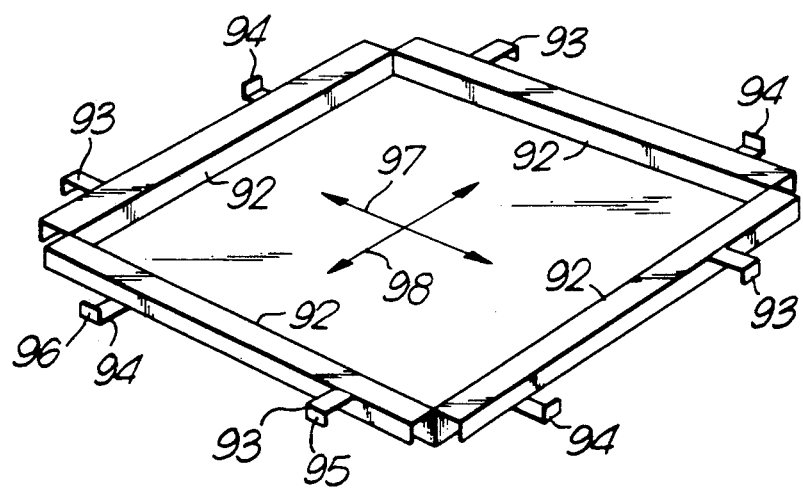
FIG. 14 is a schematic pictorial view of a construction of product-carrying unit suited to both forward and sideways advance in a conveying system according to the invention.

FIG. 14 is a schematic pictorial representation of a construction of product-carrying unit or frame suitable for both forward and transverse movement in accordance with the conveying principles of the invention, and provided with coupling arrangements which may be interconnected with those of other like trays by either lateral or sideways displacement, in a manner already briefly adverted to, as well as by forwards advance or displacement, as previously described. As shown in FIG. 14, the tray 91 which is of substantially square or rectangular configuration, is defined along its sides by four longitudinal members 92, all four of which are of longitudinally-slotted box-section material so as to be suitable for travelling engagement on guide and support rails. Each of the four side members 92 is provided with one downwardly-directed coupling or hook member 93 and one upwardly-opening or upwardly-directed hook member 94. Engagement together of two trays carried on guide and support rails of a conveyor in accordance with the invention takes place essentially in a manner similar to that already described. A second like tray or support unit is brought up against the first unit with respective side frame members of each tray adjacent to or abutting one another, but the units are sufficiently laterally displaced relative to one another so that the downwardly-directed hook 93 of the juxtaposed side of the second unit is adjacent to but at a sideways spacing from the upwardly-directed hook 94 of the adjacent side of the first unit and likewise for hook 94 of the second unit and hook 93 of the first. The downward gripping edge 95 of each unit's hook 93 is then engaged with the upwardly-directed gripping edge 96 of the hook 94 of each unit by a sidewise relative displacement of the units, so that the two trays or product-carrying units are then coupled together by the two hooks on their juxtaposed side edges and located in substantially the same travelling plane. Further advance of the trays takes place in the manner previously described.

The particular advantage afforded by the laterally engageable hooks now described is that the tray or product unit may be advanced using the conveying system of the invention either in a forwards or rearwards direction as indicated by arrows 97 or in a transverse direction as indicated by arrows 98, being supported in each case by guide and support rails travellingly engaged either with one or other of the opposite pairs of side members 92. The advantages of symmetry and lack of handedness are retained in the product-carrying unit frame construction of FIG. 14, which is of particular advantage in handling systems. However, a handed arrangement lacking in symmetry may also be provided where such a feature is found not to be important.

The travelling features of the conveyor of the invention have been generally described in regard to sliding engagement of the side members of the product-carrying frame on guide and support rails, thereby establishing or defining a travelling plane determined by the product-bearing surfaces of the product-carrying units or trays or parallel to a plane defined by these product-bearing surfaces. As already discussed however, the guidance and support of the frames may take place by means of arrangements comprising frame to support structure contact of a kind other than sliding engagement. In particular, rollers or like features may be used. Sliding engagement offers however the particular advantage of simplicity and ease of cleaning for the food industry in particular, while other arrangements might be favoured in other areas of application. Somewhat similar criteria may be applied to the selection of the particular material cross-section to be employed for the supporting side members of the frames or product-carrying units. The slotted box-sections shown in FIGS. 1 and 3 and in FIGS. 4(c) and 4(d) are particularly suited to avoiding any kind of unwanted interengagement of trays by virtue of abutting edges of trays becoming locked together, during displacement or storage away from the conveyor of the invention. The downwardly-directed outer flange of the slotted box, reference 67, FIG. 3, reference 67c, FIG. 4(c) and reference 67d, FIG. 4(d), essentially provides a buffering feature between trays in off-conveyor end to end juxtaposition with their rail-engaging side edges in abutting engagement. The channel or fin arrangements of FIG. 4(a) and 4(b) may be preferred for applications where the risks of such undesired interengagement of juxtaposed trays is relatively absent, or where simplicity of travelling engagement is of significance.

It will therefore be seen from the foregoing description of the invention in its various aspects that a multiplicity of advantages are afforded thereby. The invention provides a simple method of connecting together or coupling trays for advance along guide and support rails. Trays for use in such a system may be profiled for an exceptionally advantageous manner of support and guidance, using end frame portions of appropriate cross-section. The absence of any arrangements for mechanically driving the trays along the guide rails, other than at the very ends of the guide rails, removes an important source of contamination and difficulty in cleaning, where installations handling food products are in question. Despite the absence of intermediate drive, the provision of low friction surfaces on the guide rails ensures that advance of the trays can secured without any significant retardation. The very simplicity of the guide and support rail construction further facilitates the provision of a chamber structure of especially advantageous configuration, and in which again ease of cleaning and maximal use of the available space within the chamber are provided. Further elaborations of the system of the invention facilitate interlocking connection and uncoupling of trays at the infeed and outfeed ends of a conveyor system according to the invention. This system is especially well suited to conveying systems involving food products, and in particular to conveying systems for use in treatment chambers for food products.

FIG. 15 is an end view of a chamber of an installation in accordance with the invention. The chamber accommodates a support or conveying system 21, having a multiplicity of conveyors 22 each defined by longitudinal parallel rails 11 supported by upright members or side walls 23 of the chamber structure. Details of the guide rails of the system of the invention are further described in regard to earlier Figures of the drawings. Trays 1, also previously described, are supported between the parallel spaced-apart paired guide rails 11 by virtue of C-section end frame portions 3, which are slid onto the guide rails. The absence of any kind of drive mechanism in a conveyor installation of this kind enables the guide rails 11 to be located at a relatively close vertical spacing, typically 150 mm, i.e. 6 inches, which is sufficient to allow free circulation of air between successive stacked tiers of trays, but is nonetheless also sufficiently close to provide substantial economies in use of space for product treatment. The construction of rails 11, again also as described hereinbefore, is such that they can be mounted on the side walls 23 by means of suitably profiled support members 41, which abut flush with the vertical surfaces of the side walls and also provide smoothly curving external surfaces 42 merging onto the upright surfaces of side walls defined by members 23 and wall portions or material filling the spaces between uprights 23 along the length of the installation or chamber, without any dirt traps.

The particular improvement effected by the aspect of the invention forming the subject of FIG. 15 consists in the interposition of auxiliary guide rails or runners 111 between the main guide rails 11 at half the pitch of the main guide rails. Thus in the vertical direction of each side wall 23, a guide rail is now provided every 75 mm, i.e. every 3 inches. Supports 141 for the auxiliary guide rails 111 are indicated in schematic form only, but obviously they may also be profiled to facilitate cleaning and to provide smooth curved surfaces merging onto the vertical walls, substantially in the same manner as the supports 41 for the main guide rails.

The auxiliary rails or runners are used only during cleaning operations. A tray 101 is shown in dotted outline in position on one of the pairs of auxiliary guide rails 111. The purpose of and the use of the auxiliary guide rails can now be further described in respect of a first cleansing strategy having regard to FIG. 16, in which there is shown in diagrammatic end view a food product treatment chamber 121a with main guide rails 11 and auxiliary guide rails 111, the main and auxiliary rails being distinguished diagrammatically in this schematic view for clarity of explanation, although they may in fact be of substantially identical construction in practice. For the purposes of this present portion of the description, the chamber has been notionally divided along a horizontal plane into two sections, located one above the other, the first or upper half or portion being designated by the shaded area 122a on the drawing and the second or lower half or portion by the unshaded area 123a.

When it is desired to clean the interior of the chamber, the infeed or outfeed lift, or indeed both lifts, associated with the chamber is/are programmed to withdraw all of the trays supported on the main guide rails within the lower region 123a of the chamber and to reinsert them on the auxiliary rails 111 of the upper portion 122a of the chamber. In this manner, a complete chamber-load of trays may be accommodated within the upper region 122a of the chamber, on completion of this transfer action, at a relatively tight spacing, which would be excessively close for normal use when product is carried on the trays. This close spacing of the trays when accommodated on the auxiliary rails is however acceptable during a cleaning operation, since no product is then carried on the trays and there is no necessity for any airflow to take place between them for any treatment or storage/preservation purpose. In addition, no clearance of significance is required between the trays at this time, since they are not carrying product. On completion of this procedure, when all of the trays are in position in the upper region 122a of the chamber 121a, the lower half or region 123a is fully accessible for entry by operatives and/or equipment and the execution or carrying out of cleaning operations. Typically a chamber of the kind shown schematically in FIG. 16 is of sufficient vertical height for the cleaning operative to stand upright within the lower half 123a of the chamber when all of the trays are supported in the upper half 122a.

In like manner, the upper portion 122a of the chamber can be cleaned by simply moving all of the trays into portion 123a, again using both the main and auxiliary rails, to provide the interleaved closely stacked tiers of trays required to hold all of a complete chamber-load of trays within the chamber 121a in a first region of the chamber approximating to one-half of its interior volume or space, thereby releasing a further region of the chamber approximating to the other half of its interior volume for access for cleaning. In practice, it would be normal to clean the upper half of the chamber first, to then move all of the trays into this cleaned upper half, and complete the operation by carrying out the remaining cleansing operation required in the lower half 123a. Irrespective of the cleaning strategy used, when the chamber has been fully cleaned, those trays carried on the auxiliary rails are removed again from these rails and placed back in position on the main rails in the other portion of the chamber, thereby restoring normal tray spacing throughout the chamber for re-loading with product as required. Normal tray spacing allows full circulation of air between the trays for whatever treatment procedures are being carried on.

Alternative arrangements and dispositions of the trays during a cleansing operation may also be provided by virtue of the present invention. The purpose of and the use of the auxiliary guide rails can now be further described in respect of a second cleansing strategy having regard to FIG. 17, in which there is shown a food product treatment chamber 121b with main guide rails 11, auxiliary guide rails 111, and infeed and outfeed lifts, 125 and 126 respectively. For the purposes of the present description, the chamber has on this occasion been notionally divided longitudinally in two, a first half being designated by the shaded area 122b on the drawing and the second half by the unshaded area 123b.

When it is desired to clean the interior of the chamber, the infeed lift 125 or both lifts is/are programmed to withdraw all of the trays supported on the main guide rails within region 123b of the chamber, reinsert them on the auxiliary rails 111 and move them along the auxiliary rails into region 122b. In this manner, a complete chamber-load of trays can be accommodated within the end region 122b of the chamber, on completion of the transfer action, at relatively tight vertical spacing, which would be excessively close for normal use when product is supported on the trays. The close vertical spacing of the trays when accommodated on the auxiliary rails is however acceptable during a cleaning operation, since no product is then carried on the trays and there is no necessity for any air flow to take place between them. In addition, no vertical clearance of significance is required between the trays at this time, since they are not carrying product. On completion of this procedure, when all of the trays are in position at the end 122b of the chamber, the other half 123b is fully accessible for entry by staff and the completion of cleaning operations. By the same token, end 122b of the chamber can then subsequently be cleaned by simply moving all of the trays back into portion 123b, again using both the main and the auxiliary rails, to provide the interleaved closely stacked tiers of trays required to hold all of a complete chamber-load of trays within the chamber in a first region of the chamber approximating to one-half of its interior volume or space, thereby releasing a significant further region of the chamber approximating to its other half for access for cleaning. When the chamber has been fully cleaned, those trays on the auxiliary rails are again removed and placed back in position on the main rails at the other end of the chamber, thereby restoring normal tray spacing throughout the chamber for re-loading with product as required. Normal tray spacing allows full circulation of air between the trays for whatever treatment procedures are being carried on.

The invention provides a very significant advantage over existing systems, where cleaning typically requires all trays to be removed from the chamber and either laid down on the factory floor or accommodated on racks or the like elsewhere within the factory premises, under ambient conditions. The provision of the auxiliary rails means that all of the trays can be retained within the environmental treatment chamber or other treatment or storage installation or system by interleaving trays supported on the auxiliary rails with those carried by the main rails, so that all trays may remain accommodated within the chamber or system, even during the execution of cleaning operations, with a consequent saving in space and handling operations. This is achieved by the short pitch between the main and auxiliary rails.

FIGS. 18 to 23 show alternative coupling arrangements for interconnecting product-carrying units or trays in accordance with the invention. As shown in FIG. 18, a conical connector 115 is provided on the longer side 2 of a product tray 1. In the tray side arrangement shown in this fragmentary pictorial view, the tray side member is formed from angle section material, as distinct from the solid material of rectangular cross-section or the box-section previously indicated and/or depicted. Each conical connector 115 defines either an engaging member or a receiving member depending on its manner of association with a cooperating identical conical connector of another tray. As shown in FIG. 18, conical connector 115 has a hollow cone portion 116, tapering in an upward direction and open at each end. Cone 116 is mounted with its axis substantially vertically at a stand-off or spacing from side 2 of tray 1 by means of a mounting portion 117. On the opposite side of the cone 116 from the region where it is affixed to mount 117, a vertically extending closed end slot 118 extends vertically upwardly from the lower end of the cone 116 towards the narrower-diameter upper portion of the cone. The closed end of slot 118 is disposed a short distance below the upper edge of the cone 116. The lower or open end of slot 118 is flared, as indicated by reference 119, to define an entry opening into slot 118.

Figure 19:
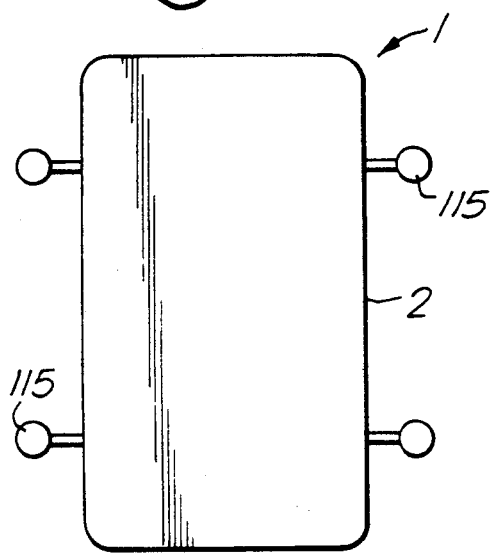
FIG. 19 is a top view of a tray for a storage or handling system in accordance with the invention, showing preferred locations for conical members according to FIG. 18 in a first arrangement.

The disposition of four connectors in accordance with FIG. 18 on the longer sides 2 of a tray 1 is shown in FIG. 19. In this arrangement, four connectors are provided, located in line with each other on each side 2 of the tray 1.

Figure 20:
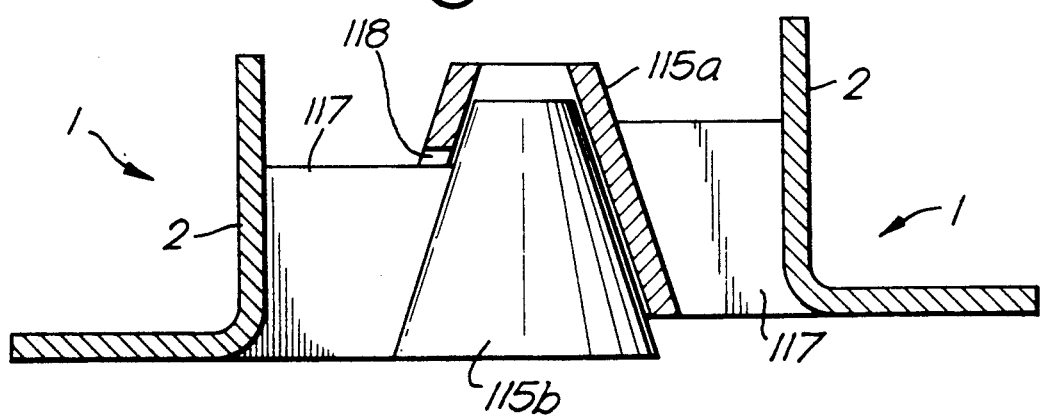
FIG. 20 is a side sectional view of conical members in accordance with FIG. 18 in an interconnected disposition.

FIG. 20 shows the manner in which the connectors 115 are engaged together to link trays according to the invention in a chain or sequence for conveyor operation. As shown in this drawing, the right-hand connector identified as 115a defines a receiving member, while the left-hand connector 115b defines the engaging member. Coupling together of the trays is effected by a relative displacement of the two trays such that the engaging member 115b is brought upwardly beneath and axially in line with the receiving member 115a, so that the cone 116 of engaging member 115b enters into the hollow interior of the cone 116 of receiving member 115a. This engaging coupling of these members is facilitated by the support bracket 117 of member 115b sliding upwardly into and along slot 118 of member 115a. Coupling movement ceases when the upper edge of strut or bracket 117 abuts against the closed upper end of slot 118 of member 115a. It will be immediately apparent of course that precisely the same engaging action can be brought about by downward movement of member 115a over and onto engaging member 115b. Thus members 115a and 115b can interchange their receiving and engaging functions, and are accordingly fully interchangeable in their roles.

In the coupled-together condition depicted in FIG. 20, the trays may be advanced along the guide rails in the manner previously described. Because the engaging and receiving members defined by the respective cones are identical, there is with this embodiment of the coupling members a slight degree of shingling or uplift of the tray carrying the receiving member relative to that carrying the cone defining the engaging member. Such shingling or uplift is of no consequence in respect of functioning of the invention, since the clearances and tolerances provided within the system may be arranged to be sufficient to cope with such minor nominal misalignment or displacement.

Figure 21:
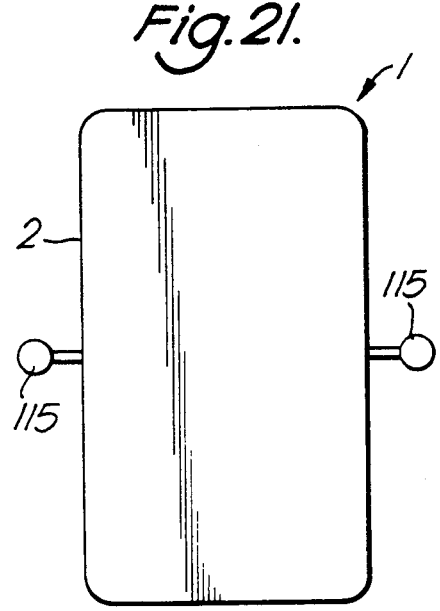
FIG. 21 is a top view of a tray in accordance with the invention provided with a single centrally located connecting member on each lateral side.

Connectors of this type are also suitable for interengagement of trays in which only a single coupling member is provided on each lateral side 2 of the tray 1. Such an arrangement is shown in FIG. 21. The individual connectors provided and designated by reference 115 in this view may be identical with those shown in FIGS. 18 and 20, but single connectors of a diversity of alternative constructions may also be employed.

Figure 22:
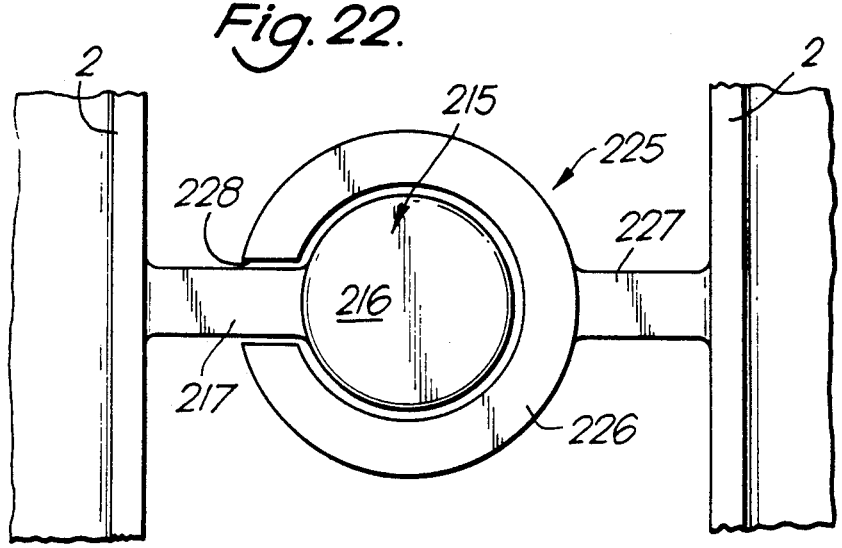
FIG. 22 is a top view of yet another coupling arrangement for the system of the invention.
Figure 23:
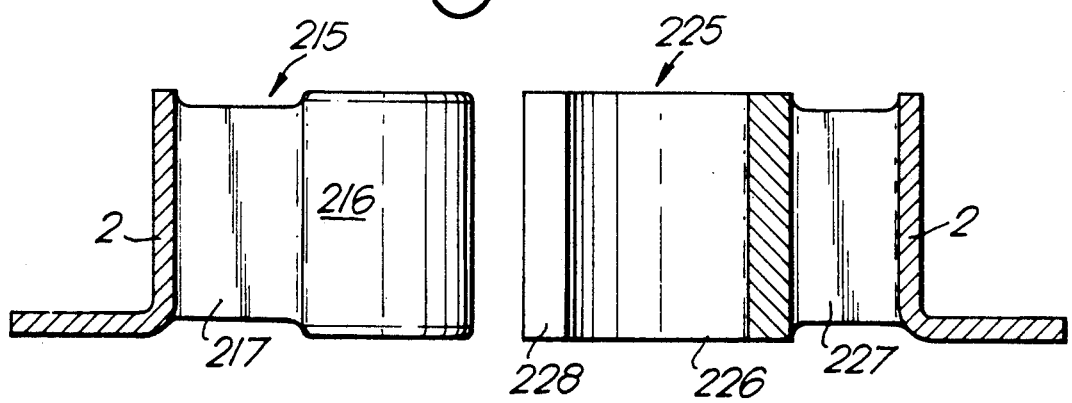
FIG. 23 is a side sectional view of the coupling arrangement of FIG. 22, in a separated condition.

FIGS. 22 and 23 show a further arrangement of mechanical coupling means, suitable for location on the sides of a tray in either of the configurations shown in FIG. 19 or FIG. 21, i.e. in either dual or single arrangements. In this embodiment however, the engaging and receiving members are of different configuration as distinct from the identical conical couplers of FIGS. 18 and 20, and each side of the tray carries either one or two engaging members or one or two receiving members. Thus with coupling means of the character now to be described, the trays cannot be coupled in a universal manner and there is degree of handedness prevailing.

As shown in FIG. 22 in connected-together top view and in the separated view in FIG. 23, the engaging member 215 is defined by a short vertically aligned cylindrical portion 216 mounted at the end of a support bracket 217. The receiving member 225 is defined by an axially slotted sleeve 226, again mounted on the side 2 of a tray 1 by means of a support bracket 227. The sides 2 of the trays of FIGS. 22 and 23 are again formed from angle section material, as compared with the solid or rectangular box-sections previously described and/or shown. The axial slot 228 of sleeve 226 is open-ended and extends throughout the vertical height of the sleeve 226, in substantially diametrically opposed alignment with the mounting bracket 227 on the free surface side of the sleeve.

Interconnection of the engaging and receiving members takes place in substantially similar manner to that already described for the cones. A relative displacement is effected between the engaging and receiving members, such that the cylinder 216 is caused to enter axially into the hollow interior of the sleeve 226. When axial alignment is achieved, so that the entirety of cylinder 216 is substantially fully received within sleeve 226, coupling engagement is complete, and the trays may then be displaced in conveyor mode as previously described. With this embodiment however, there is no shingling or uplift of the trays relative to one another and the interconnecting action or effect of the coupling means is similar in this respect to that described for the hook embodiments of the coupling means, the subject of earlier Figures and descriptive text.

Figure 24:
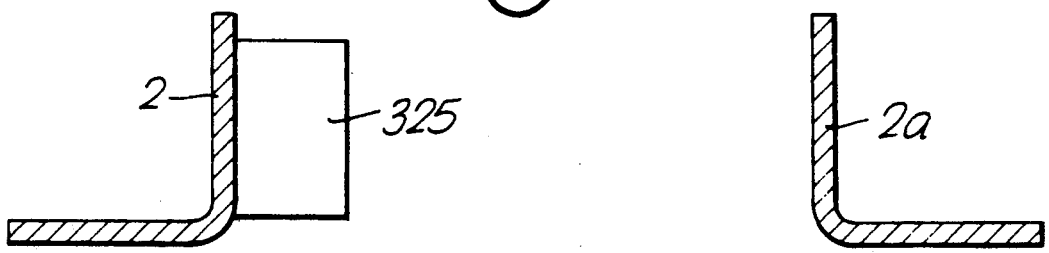
FIG. 24 is a side sectional view of a first embodiment of magnetic coupling arrangement according to the invention, in a separated condition.
Figure 25:
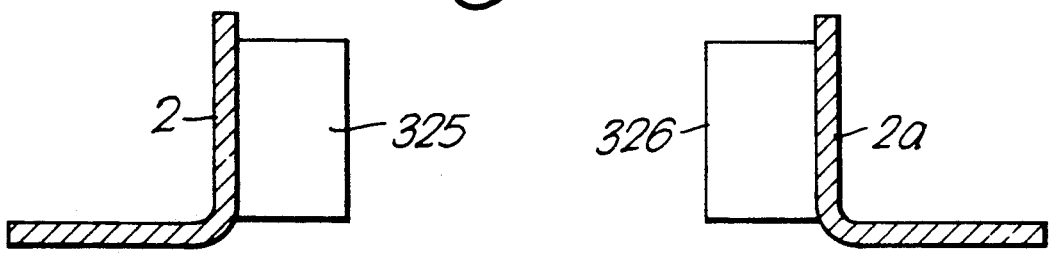
FIG. 25 is a side sectional view of a second embodiment of magnetic coupling arrangement in accordance with the invention, again in a separated condition.

FIGS. 24 and 25 show two further coupling arrangements in accordance with the present invention. In each of these figures, the coupling arrangements are applied to angle section side edge members of the tray in accordance with the invention. As shown in the side sectional view of FIG. 24, the side member 2 of one of the interconnecting trays is provided with a magnetic coupling member 325. In this arrangement, the side edge member 2a of the second tray unit with which the side edge 2 of the first unit is to interact is of magnetic material, so that when edges 2 and 2a are brought into proximity, magnetic member 325 serves to couple side edges 2 and 2a together for onward movement of the coupled together tray units.

The arrangement shown in FIG. 25 is essentially similar, the difference residing in the provision of a further magnetic member 326 on side edge 2a. Thus in this embodiment, it is not essential for side edge 2a to be of magnetic material. Again, coupling together of the trays having the side edges 2 and 2a takes place by these edges being brought into proximity so that the magnetic effect between the magnetic members 325 and 326 comes into play and engages the two tray units together for subsequent handling within the context of the invention.

In both of the embodiments shown in which magnetic members are used, namely those of FIGS. 24 and 25, one or more magnetic members may be used on the side edges 2 or 2a as appropriate, spaced apart along the length of the longer side edges 2. Thus, for example, in the embodiment of FIG. 25, edge 2 may have only a single member 325 which cooperates with member 326 of edge 2a or alternatively edge 2 may be provided with a series of longitudinally spaced apart members 325 for coupling cooperation with a corresponding series of members 326 on edge 2a.

Figure 26:
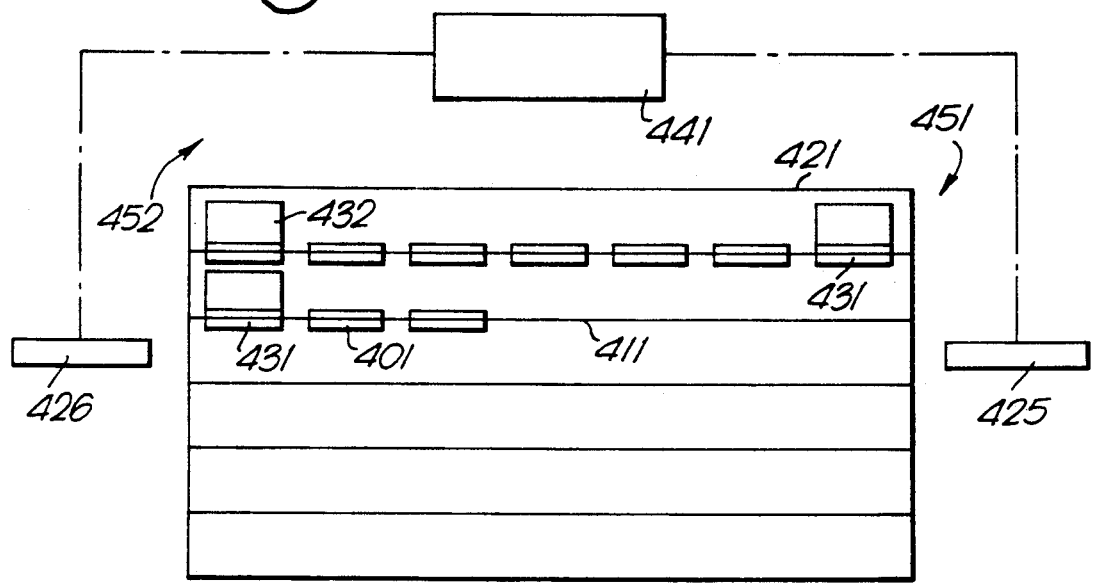
FIGS. 26 is a diagrammatic representation in side view of a product treatment system and chamber according to the invention, showing the manner of use of blocking or parking trays.

FIG. 26 is a diagrammatic representation in side view of a further embodiment of chamber arrangement in accordance with the invention, especially suited to the thermal treatment of food products. In the embodiment shown, the chamber is especially directed to the freezing of food products such as hamburgers.

As shown in FIG. 26, chamber 421 is provided with elongate sliding rails 411, similar to the arrangements previously described. The rails 411 carry product-supporting trays 401, which may take the form of any of the embodiments already described and illustrated. At certain stages in thermal treatment or storage of product supported on trays 401, the end positions on each level of rails 411 may be occupied by parking or blocking trays 431, to be further described below. Input and output of product to the chamber of FIG. 26 takes place by means of input conveyors and displacing means 425 and corresponding output equipment 426, which may be in accordance with any of the arrangements previously described, serving to advance product into the chamber by pushing and/or to withdraw it from the chamber by pulling at the same or opposite end. In the arrangement shown, chilled air may be directed through the chamber between the input and output ends in the directions indicated by arrows 451 and 452. This aspect of the system is generally conventional and known in the technology. the direction of the chilled airflow is not necessarily limited to end to end airflow and other arrangements may also be employed. Control means designated generally by reference 441 control operation of the input and output conveyors and handling units 425 and 426 and may also control the thermal and other environmental control features of the system. Suitable process controllers are known for achieving these various purposes.

The parking or blocking trays 431 are identical to the supporting trays 401 apart from having a raised lip or rim extending around at least a portion of their edge regions. This raised lip is designated in FIG. 26 by reference 432. The raised lip extends above the the general plane of the lower portion of the tray 431, which substantially approximates to or resembles tray 401, to a height where the upper edge of this raised lip will be located only a short distance below the underside of a further tray located on the next set of rails above the rails supporting tray 431, when the trays are in place on rails 411 in chamber 421. In this manner, the space existing between layers of trays supported within the chamber 421 is then essentially blocked off by the raised lip. By placing a series of parking or blocking trays 431, arranged one above the other, at one end of the chamber, the entire cross-section of the end of the chamber may be substantially blocked for through flow of air by means of all of the end positions on each level of the rails being occluded by means of a tray 431. Such an arrangement may be placed in position at each end of the chamber 421.

The purpose of these blocking or parking trays is as follows. In use of the system of the invention to carry out a product treatment step such as for example chilling hamburgers, hamburgers loaded on trays 401 are placed in position on the tiers of rails 411 within the chamber 421. At each end of the chamber, each level of trays 401 is terminated by an empty tray 401 during the treatment step. When all of the hamburger-carrying trays have been loaded, chilled air is directed through the chamber as indicated by arrows 451 and 452, the entire operation being directed by control means 441, which also effects the loading and positioning operations relating to the trays 401. Typically, a chilling operation may continue for fifteen minutes. Following chilling, it is again typically required to retain the chilled product within the chamber for a further period. It is important during this further period that airflow over the chilled product should not be excessive, as otherwise dehydration may result. In order to avoid such dehydration, the end trays 401, which as already noted do not carry product, are then removed by the conveyors and handling means 425 and 426 under the direction of control feature 441 and replaced by blocking or parking trays 431. In this manner, the entire end face as it were of the storage chamber is substantially closed off for significant through flow of air by the raised lips 432 of the trays 431, which substantially close off the spaces between the successive levels defined by the rails 411. On termination of the controlled conditions storage period, trays 431 may again be removed under the control of system 441 by the operation of the units 425 and 426, to enable access to the product-carrying trays 401. These may then be removed for further handling or treatment as required.

Figure 27:
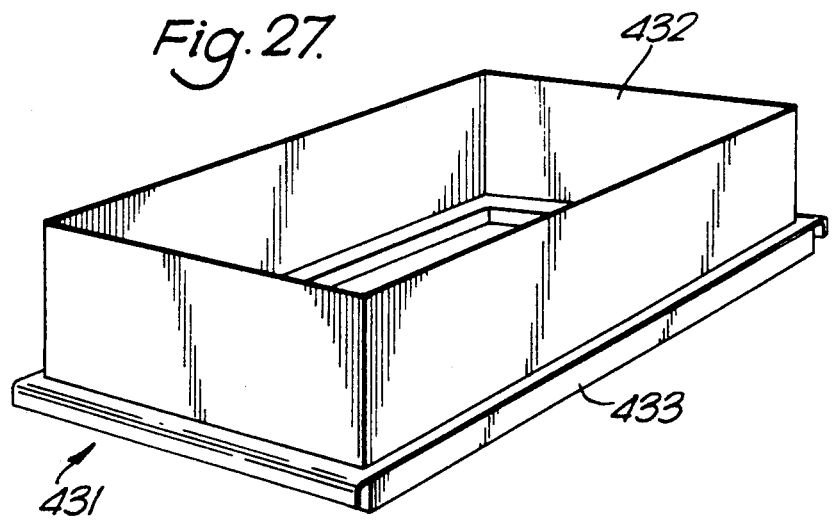
FIG. 27 is a pictorial representation of a blocking or parking tray for use in the system or installation of FIG. 26.

FIG. 27 is a pictorial view of a blocking or parking tray 431. The basic structure of the lower portion 433 of the tray, depicted as a slotted box frame structure in generalised manner only and without representation of any coupling means, may be in accordance with any of the embodiments previously described for product-carrying units. As shown in FIG. 27, the upper lip 432 may be defined by a light gauge sheet metal upward extension of the side members of the tray. The Figure shows an upward lip applied to all four base members of the tray unit, but it will be appreciated that a lesser number of upstanding lips or occluding portions may be provided as appropriate. In particular, the blocking action may be effectively achieved by merely a single upwardly extending lip being applied to just one of the transversely-extending side members running across the unit between the side members which are received on the slide rails. However, for structural integrity and ease of handling, the generally hollow box-shaped construction of FIG. 27 may be favoured. Alternatively, instead of a separate lip-defining structure applied to or mounted on the base frame 433, a substantially integral construction may be provided, where the upstanding lip portions are integral with and represent continuations of the lower side portions of the tray unit. All such variants of this aspect of the invention are considered to lie within the scope of this feature of the invention, which is effectively characterised by the provision of an airflow blocking feature to substantially close off the space between successive stacked tiers of product trays within a treatment chamber in accordance with the invention.

The control means of the system of the invention designated by reference 441 in FIG. 26 suitably comprises a computerised process control unit, programmable to undertake the diversity of control functions required to operate a system in accordance with the invention. These control functions include monitoring the position of individual trays within the chamber of the invention and activating the various drive and transfer means to position any individual tray at any individual location within the chamber, and to advance it to or withdraw it from any such location. Further operations coming under the ambit of the control means may include the advance of product or trays towards the system of the invention and the outfeed of product or trays from the system of the invention following storage or treatment. The computerised control means may also regulate the actual treatment effected within the chamber, by activating further equipment for varying the temperature, pressure or humidity within the chamber, such as, for example, equipment for passing a flow of chilled air through the chamber to freeze food products, along with associated condition monitoring arrangements. The processing steps and control features effected by this control means are effectively known in themselves and process controllers are available in the marketplace for attending to these various operations.

I claim:

1. A substantially rectangular product carrying unit in combination with guide and support rails defining guide means for travelling movement of said unit, said product-carrying unit having four edge regions, a first two of said four edge regions extending along two opposite sides of the unit for travelling engagement with respective said guide and support rails, and the other two of said four edge regions extending transversely between said first two of said four edge regions, each of said first two of said four edge regions comprising a substantially continuous elongate structure having a downwardly-directed surface in low friction engagement with cooperating upwardly-directed support means of a respective one of said guide and support rails for support of the unit during said travelling movement and said first two of said four edge regions also cooperating with said guide and support rails for lateral guidance of the unit during said travelling movement, said downwardly-directed surface being displaceable relative to said cooperating upwardly-directed support means within predetermined limits without loss of support or lateral guidance of said unit during said travelling movement and terminating outwardly of said unit in a downwardly-directed flange, the unit also having coupling means for linking the unit, when engaged with said guide and support rails, with an adjacent like unit at entry of said adjacent like unit into engagement with the same guide and support rails, said coupling means comprising at least one coupling member provided on one of said other two of said four edge regions, for interconnecting association with a coupling member of said adjacent like unit, said coupling member provided on said one of said other two of said four edge regions and said coupling member of said adjacent like unit being formed for continuing interconnecting association of the coupling members in the event of displacement within predetermined limits of said unit relative to said adjacent like unit, and said coupling means and said low-friction engagement of said downwardly-directed surfaces of said first two of said four edges of said unit with said cooperating upwardly-directed support means of said guide and support rails together enabling movement of said unit and said adjacent like unit, when linked together, along said guide and support rails in a direction of advance for the linked-together units by pulling the leading unit of the linked-together units in said direction of advance or by pushing the trailing unit of the linked-together units in said direction of advance.

2. A product-carrying unit according to claim 1, wherein said at least one coupling member is an engaging member.

3. A product-carrying unit according to claim 2, comprising at least one receiving member for interengagement with an engaging member of another product-carrying unit, said at least one receiving member being provided on the other of said other two of said four edge regions from said one of said other two of said four edge regions.

4. A product-carrying unit according to claim 1, comprising at least one receiving member for interengagement with an engaging member of another product-carrying unit, said at least one receiving member being provided on the other of said other two of said four edge regions from said one of said other two of said four edge regions, wherein said at least one coupling member is an engaging member and said engaging member comprises a hook-shaped member opening in the direction of one of said first two of said four edge regions and said at least one receiving member comprises a hook-shaped member opening in the direction of the other of said first two of said four edge regions to provide a universally interconnectible coupling arrangement, both of said other two of said four edge regions of the unit being identical so far as coupling with an adjacent like unit is concerned.

5. A product-carrying unit according to claim 3, wherein said engaging member and said at least one receiving member each comprise an identical conical member.

6. A product-carrying unit according to claim 3, wherein said engaging member and said at least one receiving member are non-identical, said at least one receiving member having a recessed or apertured portion for reception of a cooperating region of an engaging member of another product-carrying unit.

7. A product-carrying unit according to claim 1, wherein said at least one coupling member is a magnetic member.

8. A product-carrying unit according to claim 1, wherein at least one of said other two of said four edge regions has an upstanding lip of a height substantially equivalent to the vertical spacing between two of said units when engaged with respective vertically spaced apart said guide and support rails.

9. A product-carrying unit according to claim 1, wherein said first two of said four edge regions are substantially identical and each of said first two of said four edge regions is defined by a longitudinally-slotted box section member and said downwardly-directed surface is an internal surface region of said longitudinally-slotted box section member.

* * * * *